United States Patent

Melvin

[19]

[11] Patent Number: 6,049,739
[45] Date of Patent: *Apr. 11, 2000

[54] SYSTEM AND METHOD FOR CONTROLLING PROCESSES

[76] Inventor: Kenneth P. Melvin, 301 Broadway #311, Alameda, Calif. 94501

[*] Notice: This patent is subject to a terminal disclaimer.

[21] Appl. No.: 08/919,719

[22] Filed: Aug. 27, 1997

Related U.S. Application Data

[63] Continuation-in-part of application No. 08/607,469, Feb. 27, 1996, Pat. No. 5,754,424.

[51] Int. Cl.$^7$ .............................. G05B 13/02; G05B 11/36

[52] U.S. Cl. ................................ 700/37; 700/40; 318/561

[58] Field of Search .............................. 318/561; 700/37, 700/40, 69

[56] References Cited

U.S. PATENT DOCUMENTS 4,218,735 8/1980 McCutcheon .............................. 700/90
5,754,424 5/1998 Melvin ...................... 700/37

*Primary Examiner*—William Grant
*Assistant Examiner*—Sheela S. Rao
*Attorney, Agent, or Firm*—Allston L. Jones

[57] ABSTRACT

A multi-purpose controller for variables which closely controls such variables to set point by making sequential corrections to the level of input to the system of the variable based on: system response time, relationship of controller output to the variable, deviation of the variable from set point, and change in system load as determined by change in error and change in system input. The controller has a self tuning capability and can provide generation of the set point according to a set of variable parameters. It can be configured as a stand alone controller, as an intelligent Input/Output device for another intelligent device, or be resident in another intelligent device such as a programmable controller, computer or other microprocessor based device.

57 Claims, 29 Drawing Sheets

ASSUME VC = V (THE VARIABLE) AT ALL TIMES

INITIAL TUNING: DETERMINATION OF SRT

ASSUME VC = V (THE VARIABLE) AT ALL TIMES

INITIAL TUNING: CALCULATION OF SC

| MELVIN | A=0.4 | RM=6.0 | V0=S0=-50 | SF=150 | LOADING=0.0 — 220 |
|---|---|---|---|---|---|
| X= | 222 — SC= | 224 — VC= | 226 — RC= | 228 — EC= | |
| 0 | -49.8 | -50 | .4 | .2000008 | |
| 0 | -49.2 | -49.75 | .8 | .5499992 | |
| 0 | -48.2 | -48.8375 | 1.2 | .6375008 | |
| 0 | -46.8 | -47.33438 | 1.6 | .5343781 | |
| 0 | -45 | -45.55234 | 2 | .5523415 | |
| 0 | -42.8 | -43.43027 | 2.4 | .6302719 | |
| 0 | -40.2 | -40.81499 | 2.8 | .6149902 | |
| 0 | -37.2 | -37.7767 | 3.2 | .5766945 | |
| 0 | -33.8 | -34.39425 | 3.6 | .5942497 | |
| 0 | -30 | -30.61396 | 4 | .6139641 | |
| 0 | -25.8 | -26.40054 | 4.400001 | .6005383 | |
| 0 | -21.2 | -21.79171 | 4.800001 | .5917149 | |
| 0 | -16.2 | -16.80115 | 5.200001 | .6011505 | |
| 0 | -10.8 | -11.40456 | 5.600001 | .6045637 | |
| 0 | -4.999996 | -5.59849 | 6.000001 | .5984941 | |
| 0 | 1.000004 | .602375 | 6 | .3976293 | |
| 0 | 7.000004 | 6.948702 | 6 | 5.130243E-02 | |
| 0 | 13 | 13.03637 | 6 | -.0363636 | |
| 0 | 19 | 18.93534 | 6 | 6.466866E-02 | |
| 0 | 25 | 24.95283 | 6 | 4.717827E-02 | |
| 0 | 31 | 31.02963 | 6 | -2.963066E-02 | |
| 0 | 37 | 37.01483 | 6 | -1.482773E-02 | |
| 0 | 43 | 42.9771 | 6 | 2.290344E-02 | |
| 0 | 49 | 48.99427 | 6 | 5.729675E-03 | |
| 0 | 55 | 55.01373 | 6 | -.0137291 | |
| 0 | 61 | 61.00058 | 6 | -5.722046E-04 | |
| 0 | 67 | 66.99185 | 6 | 8.148193E-03 | |
| 0 | 73 | 73.0011 | 6 | -1.098633E-03 | |
| 0 | 79 | 79.00449 | 6 | -4.486084E-03 | |
| 0 | 85 | 84.99854 | 6 | 1.464844E-03 | |
| 0 | 91 | 90.99767 | 6 | 2.334595E-03 | |
| 0 | 97 | 97.00127 | 6 | -1.266479E-03 | |
| 0 | 103 | 103.0011 | 6 | -1.113892E-03 | |
| 0 | 108.8085 | 108.9991 | 5.617021 | -.1905518 | |
| 0 | 114.234 | 114.7602 | 5.234042 | -.526123 | |
| 0 | 119.2766 | 119.8876 | 4.851064 | -.6110077 | |
| 0 | 123.9362 | 124.448 | 4.468085 | -.511795 | |
| 0 | 128.2128 | 128.7412 | 4.085107 | -.5284576 | |
| 0 | 132.1064 | 132.7098 | 3.702128 | -.6034393 | |
| 0 | 135.617 | 136.206 | 3.31915 | -.589035 | |
| 0 | 138.7447 | 139.2968 | 2.936171 | -.552124 | |
| 0 | 141.4893 | 142.0582 | 2.553193 | -.5688324 | |
| 0 | 143.851 | 144.4389 | 2.170215 | -.5878601 | |
| 0 | 145.8298 | 146.4048 | 1.787237 | -.5750427 | |
| 0 | 147.4255 | 147.992 | 1.404258 | -.5665131 | |

FIG. 6aa continued on Fig. 6ab continued from Fig. 6aa

MELVIN    A=0.4    RM=6.0    V0=S0=-50    SF=150    LOADING=0.0 — 220

| X= | 222—SC= | 224—VC= | 226—RC= | 228—EC= |
|---|---|---|---|---|
| 0 | 148.6383 | 149.2138 | 1.021279 | -.5755463 |
| 0 | 149.4681 | 150.0469 | .6383007 | -.5788574 |
| 0 | 149.9149 | 150.4879 | .2553233 | -.5730438 |
| 0 | 149.9787 | 150.5509 | -.1276357 | -.5721741 |
| 0 | 150.0511 | 150.2353 | .2723643 | -.1842041 |
| 0 | 150 | 150.0224 | -.1276357 | -2.241516E-02 |
| 0 | 150 | 150.0672 | 0 | -6.716919E-02 |
| 0 | 150 | 150.0261 | 0 | -2.609253E-02 |
| 0 | 150 | 149.9785 | 0 | 2.145386E-02 |
| 0 | 150 | 149.9984 | 0 | 1.617432E-03 |

| MELVIN | A=0.4 | RM=6.0 | V0=S0=150 | SF=-50 | LOADING=0.0 — 230 |
|---|---|---|---|---|---|
| X= | 232 — SC= | 234 — VC= | 236 — RC= | 238 — EC= | |
| 0 | 149.8 | 150 | -.4 | -.1999969 | |
| 0 | 149.2 | 149.75 | -.8 | -.5500031 | |
| 0 | 148.2 | 148.8375 | -1.2 | -.6374969 | |
| 0 | 146.8 | 147.3344 | -1.6 | -.5343628 | |
| 0 | 145 | 145.5524 | -2 | -.5523529 | |
| 0 | 142.8 | 143.4303 | -2.4 | -.6302795 | |
| 0 | 140.2 | 140.815 | -2.8 | -.6149902 | |
| 0 | 137.2 | 137.7767 | -3.2 | -.5766907 | |
| 0 | 133.8 | 134.3942 | -3.6 | -.5942383 | |
| 0 | 130 | 130.614 | -4 | -.6139679 | |
| 0 | 125.8 | 126.4006 | -4.400001 | -.6005478 | |
| 0 | 121.2 | 121.7917 | -4.800001 | -.591713 | |
| 0 | 116.2 | 116.8012 | -5.200001 | -.6011505 | |
| 0 | 110.8 | 111.4046 | -5.600001 | -.6045685 | |
| 0 | 105 | 105.5985 | -6.000001 | -.5984955 | |
| 0 | 99 | 99.39763 | -6 | -.3976288 | |
| 0 | 93 | 93.0513 | -6 | -5.130005E-02 | |
| 0 | 87 | 86.96363 | -6 | 3.636932E-02 | |
| 0 | 81 | 81.06467 | -6 | -6.466675E-02 | |
| 0 | 75 | 75.04718 | -6 | -4.718018E-02 | |
| 0 | 69 | 68.97037 | -6 | 2.963257E-02 | |
| 0 | 63 | 62.98517 | -6 | 1.483154E-02 | |
| 0 | 57 | 57.0229 | -6 | -2.290344E-02 | |
| 0 | 51 | 51.00573 | -6 | -5.73349E-03 | |
| 0 | 45 | 44.98627 | -6 | 1.372528E-02 | |
| 0 | 39 | 38.99943 | -6 | 5.722046E-04 | |
| 0 | 33 | 33.00815 | -6 | -8.152008E-03 | |
| 0 | 27 | 26.99889 | -6 | 1.106262E-03 | |
| 0 | 21 | 20.99551 | -6 | 4.493713E-03 | |
| 0 | 15 | 15.00146 | -6 | -1.464844E-03 | |
| 0 | 9 | 9.002335 | -6 | -2.334595E-03 | |
| 0 | 3 | 2.998734 | -6 | 1.266479E-03 | |
| 0 | -3 | -3.001114 | -6 | 1.113892E-03 | |
| 0 | -9 | -8.999062 | -6 | -9.384155E-04 | |
| 0 | -14.78049 | -14.99953 | -5.560976 | .219039 | |
| 0 | -20.12195 | -20.72624 | -5.121951 | .60429 | |
| 0 | -25.02439 | -25.72425 | -4.682927 | .6998596 | |
| 0 | -29.48781 | -30.07393 | -4.243902 | .5861225 | |
| 0 | -33.5122 | -34.11841 | -3.804878 | .6062126 | |
| 0 | -37.09756 | -37.78955 | -3.365853 | .6919899 | |
| 0 | -40.2439 | -40.91886 | -2.926829 | .6749611 | |
| 0 | -42.95122 | -43.58405 | -2.487805 | .6328354 | |
| 0 | -45.21951 | -45.87177 | -2.048781 | .6522636 | |
| 0 | -47.04878 | -47.7227 | -1.609756 | .6739235 | |
| 0 | -48.43902 | -49.09811 | -1.170732 | .6590919 | |
| 0 | -49.39024 | -50.03966 | -.731708 | .6494141 | |

FIG. 6ba      continued on Fig. 6bb continued from Fig. 6ba

MELVIN    A=0.4    RM=6.0    V0=SO=150    SF=-50    LOADING=0.0 — 230

| X= 232—SC= | 234—VC= | 236—RC= | 238—EC= |
|---|---|---|---|
| 0    -49.90244 | -50.56226 | -.292683 | .6598244 |
| 0    -49.97561 | -50.63917 | .1463421 | .663559 |
| 0    -50.02927 | -50.26662 | -.2536579 | .2373581 |
| 0    -50 | -49.9852 | .1463421 | -1.480103E-02 |
| 0    -50 | -50.05571 | 0 | 5.570984E-02 |
| 0    -50 | -50.06604 | 0 | 6.604004E-02 |
| 0    -50 | -49.98496 | 0 | -1.503754E-02 |
| 0    -50 | -49.97715 | 0 | -2.285004E-02 |
| 0    -50 | -50.01832 | 0 | 1.831818E-02 |

| PRIOR ART | A=0.4 | RM=6.0 | V0=S0=-50 | SF=150 | LOADING=0.0 — 240 |
|---|---|---|---|---|---|
| X= 242 | SC= | 244 VC= | 246 RC= | 248 EC= | |

| X= | SC= | VC= | RC= | EC= |
|---|---|---|---|---|
| 0 | -49.8 | -50 | .4 | .2000008 |
| 0 | -49.2 | -49.8 | .8 | .5999985 |
| 0 | -48.2 | -49.1 | 1.2 | .8999977 |
| 0 | -46.8 | -48 | 1.6 | 1.200001 |
| 0 | -45 | -46.65 | 2 | 1.650002 |
| 0 | -42.8 | -44.85 | 2.4 | 2.049999 |
| 0 | -40.2 | -42.575 | 2.8 | 2.374996 |
| 0 | -37.2 | -40 | 3.2 | 2.799999 |
| 0 | -33.8 | -37.0375 | 3.6 | 3.237503 |
| 0 | -30 | -33.5875 | 4 | 3.5875 |
| 0 | -25.8 | -29.78125 | 4.400001 | 3.981249 |
| 0 | -21.2 | -25.625 | 4.800001 | 4.425003 |
| 0 | -16.2 | -21.00312 | 5.200001 | 4.803125 |
| 0 | -10.8 | -15.97812 | 5.600001 | 5.178123 |
| 0 | -4.999996 | -10.61094 | 6.000001 | 5.61094 |
| 0 | 1.000004 | -4.812497 | 6 | 5.812501 |
| 0 | 7.000004 | 1.216413 | 6 | 5.783592 |
| 0 | 13 | 7.100783 | 6 | 5.89922 |
| 0 | 19 | 12.98555 | 6 | 6.014457 |
| 0 | 25 | 19.05782 | 6 | 5.942188 |
| 0 | 31 | 25.05762 | 6 | 5.942383 |
| 0 | 37 | 30.96387 | 6 | 6.036137 |
| 0 | 43 | 37.0001 | 6 | 5.999905 |
| 0 | 49 | 43.04688 | 6 | 5.953121 |
| 0 | 55 | 48.98189 | 6 | 6.018112 |
| 0 | 61 | 54.97661 | 6 | 6.023392 |
| 0 | 67 | 61.0325 | 6 | 5.967503 |
| 0 | 73 | 67.00264 | 6 | 5.99736 |
| 0 | 79 | 72.97205 | 6 | 6.027946 |
| 0 | 85 | 79.01492 | 6 | 5.985077 |
| 0 | 91 | 85.01529 | 6 | 5.984711 |
| 0 | 97 | 90.97856 | 6 | 6.021439 |
| 0 | 103 | 96.99982 | 6 | 6.000183 |
| 0 | 108.8085 | 103.0184 | 5.617021 | 5.790146 |
| 0 | 114.234 | 108.7979 | 5.234042 | 5.436157 |
| 0 | 119.2766 | 114.129 | 4.851064 | 5.147568 |
| 0 | 123.9362 | 119.0996 | 4.468085 | 4.836571 |
| 0 | 128.2128 | 123.7919 | 4.085107 | 4.420883 |
| 0 | 132.1064 | 128.0573 | 3.702128 | 4.049118 |
| 0 | 135.617 | 131.8985 | 3.31915 | 3.718475 |
| 0 | 138.7447 | 135.4311 | 2.936171 | 3.313538 |
| 0 | 141.4893 | 138.5793 | 2.553193 | 2.909988 |
| 0 | 143.851 | 141.2869 | 2.170215 | 2.564178 |
| 0 | 145.8298 | 143.6493 | 1.787237 | 2.180511 |
| 0 | 147.4255 | 145.6569 | 1.404258 | 1.768661 |

FIG. 6ca continued on Fig. 6cb continued from Fig. 6ca

PRIOR ART   A=0.4   RM=6.0   V0=S0=-50   SF=150   LOADING=0.0 — 240

| X= 242 | SC= | 244 VC= | 246 RC= | 248 EC= |
|---|---|---|---|---|
| 0 | 148.6383 | 147.2337 | 1.021279 | 1.404602 |
| 0 | 149.4681 | 148.4324 | .6383007 | 1.035706 |
| 0 | 149.9149 | 149.286 | .2553233 | .6288452 |
| 0 | 149.9787 | 149.7304 | -.1276357 | .248291 |
| 0 | 150.0511 | 149.7753 | .2723643 | .2757874 |
| 0 | 150 | 149.8608 | -.1276357 | .1391907 |
| 0 | 150 | 150.0137 | 0 | -1.374817E-02 |
| 0 | 150 | 149.9317 | 0 | 6.829834E-02 |
| 0 | 150 | 149.9235 | 0 | 7.647705E-02 |
| 0 | 150 | 150.041 | 0 | -4.101563E-02 |

| MELVIN | IO=75 | VC=VO=140 | SO=150 | SF=150 | DISRUPTION=10 — 250 |
|---|---|---|---|---|---|
| X= 252 | SC= | 254 VC= | | RC= | 256 EC= |
| 0 | 150 | 140 | | 0 | 10 |
| 0 | 150 | 145 | | 0 | 5 |
| 0 | 150 | 151.25 | | 0 | -1.25 |
| 0 | 150 | 150.3125 | | 0 | -.3125 |
| 0 | 150 | 148.2031 | | 0 | 1.796875 |
| 0 | 150 | 149.707 | | 0 | .2929688 |
| 0 | 150 | 150.9033 | | 0 | -.9033203 |
| 0 | 150 | 149.9231 | | 0 | .0769043 |
| 0 | 150 | 149.4559 | | 0 | .5441284 |
| 0 | 150 | 150.1283 | | 0 | -.1282501 |
| 0 | 150 | 150.2849 | | 0 | -.2848969 |
| 0 | 150 | 149.8711 | | 0 | .1289368 |
| 0 | 150 | 149.8574 | | 0 | .1426239 |
| 0 | 150 | 150.1 | | 0 | -.1000366 |
| 0 | 150 | 150.0641 | | 0 | -6.408691E-02 |
| 0 | 150 | 149.9303 | | 0 | 6.965637E-02 |
| 0 | 150 | 149.9756 | | 0 | 2.444458E-02 |
| 0 | 150 | 150.0447 | | 0 | -4.473877E-02 |

| PRIOR ART | IO=75 | VC=VO=140 | SO=150 | SF=150 | DISRUPTION=10 — 251 |
|---|---|---|---|---|---|
| X= 253 | SC= | 255 VC= | | RC= | 257 EC= |
| 0 | 150 | 140 | | 0 | 10 |
| 0 | 150 | 145 | | 0 | 5 |
| 0 | 150 | 150 | | 0 | 0 |
| 0 | 150 | 147.5 | | 0 | 2.5 |
| 0 | 150 | 147.5 | | 0 | 2.5 |
| 0 | 150 | 151.25 | | 0 | -1.25 |
| 0 | 150 | 150 | | 0 | 0 |
| 0 | 150 | 148.125 | | 0 | 1.875 |
| 0 | 150 | 150.625 | | 0 | -.625 |
| 0 | 150 | 150.9375 | | 0 | -.9375 |
| 0 | 150 | 148.75 | | 0 | 1.25 |
| 0 | 150 | 149.8438 | | 0 | .15625 |
| 0 | 150 | 151.0938 | | 0 | -1.09375 |
| 0 | 150 | 149.4531 | | 0 | .546875 |
| 0 | 150 | 149.375 | | 0 | .625 |
| 0 | 150 | 150.8203 | | 0 | -.8203125 |
| 0 | 150 | 150.0391 | | 0 | -.0390625 |
| 0 | 150 | 149.2773 | | 0 | .7226563 |

FIG. 6d

| MELVIN | IO=75 | VC=VO=150 | SO=150 | SF=150 | LOAD=INCREASING — 260 |
|---|---|---|---|---|---|
| X= — 262 | SC= | VC= | | RC= | 264 — EC= |
| 0 | 150 | 150 | | 0 | 0 |
| 1 | 150 | 149 | | 0 | 1 |
| 1 | 150 | 149.25 | | 0 | .75 |
| 1 | 150 | 150.3125 | | 0 | -.3125 |
| 1 | 150 | 150.2031 | | 0 | -.203125 |
| 1 | 150 | 149.707 | | 0 | .2929688 |
| 1 | 150 | 149.9033 | | 0 | 9.667969E-02 |
| 1 | 150 | 150.1731 | | 0 | -.1730957 |
| 1 | 150 | 150.0184 | | 0 | -1.837158E-02 |
| 1 | 150 | 149.8939 | | 0 | .1061249 |
| 0 | 150 | 151.0076 | | 0 | -1.007553 |
| 0 | 150 | 150.8095 | | 0 | -.8095398 |
| 0 | 150 | 149.6721 | | 0 | .3279266 |
| 0 | 150 | 149.7651 | | 0 | .2348633 |
| 0 | 150 | 150.3076 | | 0 | -.3076324 |
| 0 | 150 | 150.1124 | | 0 | -.1123505 |
| 0 | 150 | 149.8156 | | 0 | .1844482 |
| 0 | 150 | 149.9746 | | 0 | 2.537537E-02 |
| 0 | 150 | 150.114 | | 0 | -.1139679 |
| 0 | 150 | 149.9951 | | 0 | 4.928589E-03 |
| 0 | 150 | 149.9355 | | 0 | 6.454468E-02 |

| PRIOR ART | IO=75 | VC=VO=150 | SO=150 | SF=150 | LOAD=INCREASING — 261 |
|---|---|---|---|---|---|
| X= — 263 | SC= | VC= | | RC= | 265 — EC= |
| 0 | 150 | 150 | | 0 | 0 |
| 1 | 150 | 149 | | 0 | 1 |
| 1 | 150 | 149 | | 0 | 1 |
| 1 | 150 | 149.5 | | 0 | .5 |
| 1 | 150 | 149 | | 0 | 1 |
| 1 | 150 | 148.75 | | 0 | 1.25 |
| 1 | 150 | 149.25 | | 0 | .75 |
| 1 | 150 | 149.125 | | 0 | .875 |
| 1 | 150 | 148.75 | | 0 | 1.25 |
| 1 | 150 | 149.0625 | | 0 | .9375 |
| 0 | 150 | 150.1875 | | 0 | -.1875 |
| 0 | 150 | 149.8438 | | 0 | .15625 |
| 0 | 150 | 149.4375 | | 0 | .5625 |
| 0 | 150 | 150.1719 | | 0 | -.171875 |
| 0 | 150 | 150.2031 | | 0 | -.203125 |
| 0 | 150 | 149.6328 | | 0 | .3671875 |
| 0 | 150 | 149.9844 | | 0 | .015625 |
| 0 | 150 | 150.2852 | | 0 | -.2851563 |
| 0 | 150 | 149.8242 | | 0 | .1757813 |
| 0 | 150 | 149.8496 | | 0 | .1503906 |
| 0 | 150 | 150.2305 | | 0 | -.2304688 |

FIG. 6e

| MELVIN | IO=75 | VC=VO=150 | SO=150 | SF=150 | LOAD=DECREASING — 270 |
|---|---|---|---|---|---|
| X= — 272 | SC= | VC= | | RC= | 274 — EC= |
| 0 | 150 | 150 | | 0 | 0 |
| -1 | 150 | 151 | | 0 | -1 |
| -1 | 150 | 150.75 | | 0 | -.75 |
| -1 | 150 | 149.6875 | | 0 | .3125 |
| -1 | 150 | 149.7969 | | 0 | .203125 |
| -1 | 150 | 150.293 | | 0 | -.2929688 |
| -1 | 150 | 150.0967 | | 0 | -9.667969E-02 |
| -1 | 150 | 149.8269 | | 0 | .1730957 |
| -1 | 150 | 149.9816 | | 0 | 1.837158E-02 |
| -1 | 150 | 150.1061 | | 0 | -.1061249 |
| 0 | 150 | 148.9924 | | 0 | 1.007553 |
| 0 | 150 | 149.1905 | | 0 | .8095398 |
| 0 | 150 | 150.3279 | | 0 | -.3279266 |
| 0 | 150 | 150.2349 | | 0 | -.2348633 |
| 0 | 150 | 149.6924 | | 0 | .3076324 |
| 0 | 150 | 149.8876 | | 0 | .1123505 |
| 0 | 150 | 150.1844 | | 0 | -.1844482 |
| 0 | 150 | 150.0254 | | 0 | -2.537537E-02 |
| 0 | 150 | 149.886 | | 0 | .1139679 |
| 0 | 150 | 150.0049 | | 0 | -4.928589E-03 |
| 0 | 150 | 150.0645 | | 0 | -6.454468E-02 |

| PRIOR ART | IO=75 | VC=VO=150 | SO=150 | SF=150 | LOAD=DECREASING — 271 |
|---|---|---|---|---|---|
| X= — 273 | SC= | VC= | | RC= | 275 — EC= |
| 0 | 150 | 150 | | 0 | 0 |
| -1 | 150 | 151 | | 0 | -1 |
| -1 | 150 | 151 | | 0 | -1 |
| -1 | 150 | 150.5 | | 0 | -.5 |
| -1 | 150 | 151 | | 0 | -1 |
| -1 | 150 | 151.25 | | 0 | -1.25 |
| -1 | 150 | 150.75 | | 0 | -.75 |
| -1 | 150 | 150.875 | | 0 | -.875 |
| -1 | 150 | 151.25 | | 0 | -1.25 |
| -1 | 150 | 150.9375 | | 0 | -.9375 |
| 0 | 150 | 149.8125 | | 0 | .1875 |
| 0 | 150 | 150.1563 | | 0 | -.15625 |
| 0 | 150 | 150.5625 | | 0 | -.5625 |
| 0 | 150 | 149.8281 | | 0 | .171875 |
| 0 | 150 | 149.7969 | | 0 | .203125 |
| 0 | 150 | 150.3672 | | 276 { | -.3671875 |
| 0 | 150 | 150.0156 | | 0 | -.015625 |
| 0 | 150 | 149.7148 | | 0 | .2851563 |
| 0 | 150 | 150.1758 | | 0 | -.1757813 |
| 0 | 150 | 150.1504 | | 0 | -.1503906 |
| 0 | 150 | 149.7695 | | 0 | .2304688 |

FIG. 6f

SYSTEM AND METHOD FOR CONTROLLING PROCESSES

CROSS REFERENCE

This application is a continuation-in-part application of the application having Ser. No. 08/607,469 filed on Feb. 27, 1996, now U.S. Pat. No. 5,754,424.

FIELD OF THE INVENTION

The present invention relates to the controlling of variables in an operational system, more specifically, variables such as pressure, temperature, velocity, altitude, direction, position, flow, ratios, etc., to a reference or set point.

BACKGROUND OF THE INVENTION

In the broad field of process control, controllers are used to control a variable of a system to a reference value or set point. Such a system consists of one or more components operating as a unit to perform a certain function with the function performed by the system being the system output, or load. In order to produce the system output, the system must have input. Controlling a variable of a system to set point is accomplished by controlling one or more of the inputs essential to the system output.

Often, the controlled system input is energy and the system output is work with the controlled, or process, variable being a measure of the degree of concentration of energy, an ingredient, etc., in the system. Additionally, the process variable is usually directly proportional to input and inversely proportional to load. Thus increasing only the system input increases (decreases for cooling, vacuum, etc. applications) the controlled variable, and increasing only the system load decreases (increases for cooling, vacuum, etc. applications) the controlled variable. Or, the change in the variable, dV, can be expressed mathematically as: dV=dI−dL, where dI is the change in input and dL the change in load, or output.

In an unloaded system, the variable would change in direct proportion to the change in input. The controlled variable is, at any given time, a function of the system energy, ingredient, etc., as represented by the level of the variable itself, the input to the system, and the load on the system. The deviation of the variable from a reference set point is defined as the error of control, or error with this error at any given time being a function of the set point, controlled variable, and previous error. The change in error during a period of time is a function of the changes in either or both system input and system load during that time period (changes in set point are seen as load changes). The control of the variable to set point is accomplished by making changes to system input.

It should be noted that the controller for a system, too, has output and input with the controller output controlling system input and the controller input being an analog of the process variable.

Most existing controllers use the system error to determine what changes to make to a system input in order to control the variable at, or near, set point. Some controllers make changes to their output based on present error only, others on the present error plus the integral of previous error over time, while still others use a summing of present error and the change in error for determining changes to output. Sometimes, system load is measured and provided to the system controller as feedback. In such applications, the controller combines load with error in determining its output, or the system input. Load measurement tends to be expensive for simple applications of single system output or load, and becomes very expensive for those systems of multiple output.

In the simpler analog control applications; the system input, variable and output are closely coupled. A change of either input or output produces an equivalent change in variable. There is no buffer between input and variable or between load and variable. Often, in these simpler applications, speed or rate is the controlled variable. For controlling the speed of something coupled to an electric motor; the controlled system input would be the power to the motor. This power is controlled by changing the voltage, or voltage and frequency, applied to the motor. When the load is constant, a change of power to the motor would produce a proportionate speed change. With power to the motor constant; a change in load would produce a proportionate change in speed. The variable is controlled to set point by controlling the ratio of input to load. Some existing controllers for these simpler applications periodically sense the variable, compare the variable to some reference or set point, and make correction to the controlled system input proportional to the difference of variable and reference, or the error. Controllers using this approach in these types of simpler applications control fairly well when neither the set point nor the load change too often or too much. These controllers can, when neither the set point nor the load are changing, over time, bring the variable to set point, otherwise a better controller is needed.

A PID (Proportional Integral Derivative) controller is most widely used for those applications where the system input and output are not closely coupled. In such systems, there is a buffer, accumulator, reservoir, fly-wheel, or storage for energy, ingredient, etc., between the system input and load(s). The effects of a change in either input or output on the variable are mitigated by the storage of the buffer. Examples include applications where the controlled variable is a measure of a degree of concentration, or of degree present; e.g., pH, conductivity, ppm, temperature, pressure, altitude, speed, etc.; in the buffer. In various forms, the PID based controller calculates the deviation of the process variable from set point (error), applies a multiplier for (P) roportioning or gain to this error, (I)ntegrates the error over time, and may take the (D)erivative or slope of the process variable; then combines these per a formula to calculate an output value for controlling the system input.

PID controllers provide less than ideal control, for example when the process variable is not at set point; controller output to the controlled system input is a function of: the present error, a summing of the previous error, and, perhaps, the present change in error. When the process variable is at set point and stable, controller output to the controlled system input is a summing of previous error. Additionally, the PID controller output is always based on what has happened. For such controllers, output to the system input is truly a summing of past inability to control the process to set point. These controllers can be quite difficult to tune to a process and usually provide good control only at or near those steady state conditions for which they were tuned, and the tuning suited for normal operation near set point is unsuitable for startup and disturbances beyond the norm. Further, it is well known that PID controllers tend to become lost or behave in a chaotic manner when an out of the ordinary set of operating conditions arises.

McCutcheon, U.S. Pat. No. 4,218,735, addresses an example of a simpler analog control application, one with input, variable and output closely coupled. In the example of McCutcheon, the controlled variable is the speed of a motor driven scan system. The variable, the speed of a scan motor, is controlled to a reference ratio of the speed of the scan motor to the speed of another motor, a drum motor. Correction proportional to the present difference between the variable and the reference, the error, and the change in error over time is periodically made to the system input of which the controlled variable is a direct function. Adding change in error over time to controller output makes the McCutcheon controller more responsive to load changes and, thus, better at controlling the variable to set point. The McCutcheon controller, properly tuned to an application where the system is close coupled and changes in load are small and not continuous, works quite well.

Since all process control is time based, measurements are taken, corrections are made, and rates of change are calculated on the basis of time. For a process controller to function at all well, the actions of the controller must all be correlated with the time it takes the system to respond to changes of input and load, thus, system response time is an essential tuning parameter for the controller in any application.

In order to control a system, the input needs to be, at minimum, of a slightly greater capacity than the load. It may be of some 30 to 100% greater capacity, or even more, in order to overcome the inertia, thermal mass, etc., of the system, and afford adequate response. Moreover, the units of the error are those of the variable, (e.g., degrees, etc.) while those of the output of the controller are usually percent. For a system with an unchanging load, a given change of the controlled input would produce a given change in the variable. The ratio of the change of input to that of the resultant change in the variable is a system characteristic. Somehow, in the tuning of any controller, this relationship needs to be addressed.

If a controller asks that of a system which it can not perform, control is lost. So, the set point for a controlled variable of a system needs always to be in accordance with system status and capacity.

SUMMARY OF THE INVENTION

The controller of the present invention makes sequential corrections to the level of input to the system of the variable based on: system response time, relationship of controller output to the variable characteristic of the system, deviation of the variable from set point, and change in system load as determined by combining change in error with changes in system input, or by doubling the change in error. Correction to system input equivalent the error or deviation is made each cycle by first converting the error to units of controller output and adding same to the previous controller output. For those times when system load is unchanging, this correction alone would bring the process variable equal to the set point. For most systems, the load changes often or even constantly. Each cycle, the controller of the present invention makes additional correction to the system input equivalent to the change in system load. Due to this unique capacity to change system input based on error and change in load, the controller of the present invention controls the process variable at or very near set point during all phases of system operation. The controller of the present invention has self tuning capability and can provide generation of the set point according to a set of variable parameters. It can be configured as a stand alone controller, as an intelligent Input/Output device for another intelligent device, or be resident another intelligent device such as a programmable controller, computer or other microprocessor based device.

BRIEF DESCRIPTION OF THE DRAWINGS

FIGS. 6aa–6ab and 6ba–6bb illustrate examples of controller operational response for a controller of the present invention.

FIGS. 6ca–6cb illustrate an example of controller operational response for the McCutcheon controller of the prior art.

FIGS. 6d–6f are a comparison of the McCutcheon and present invention controller operational responses.

DETAILED DESCRIPTION OF THE PRESENT INVENTION

Figure 3:
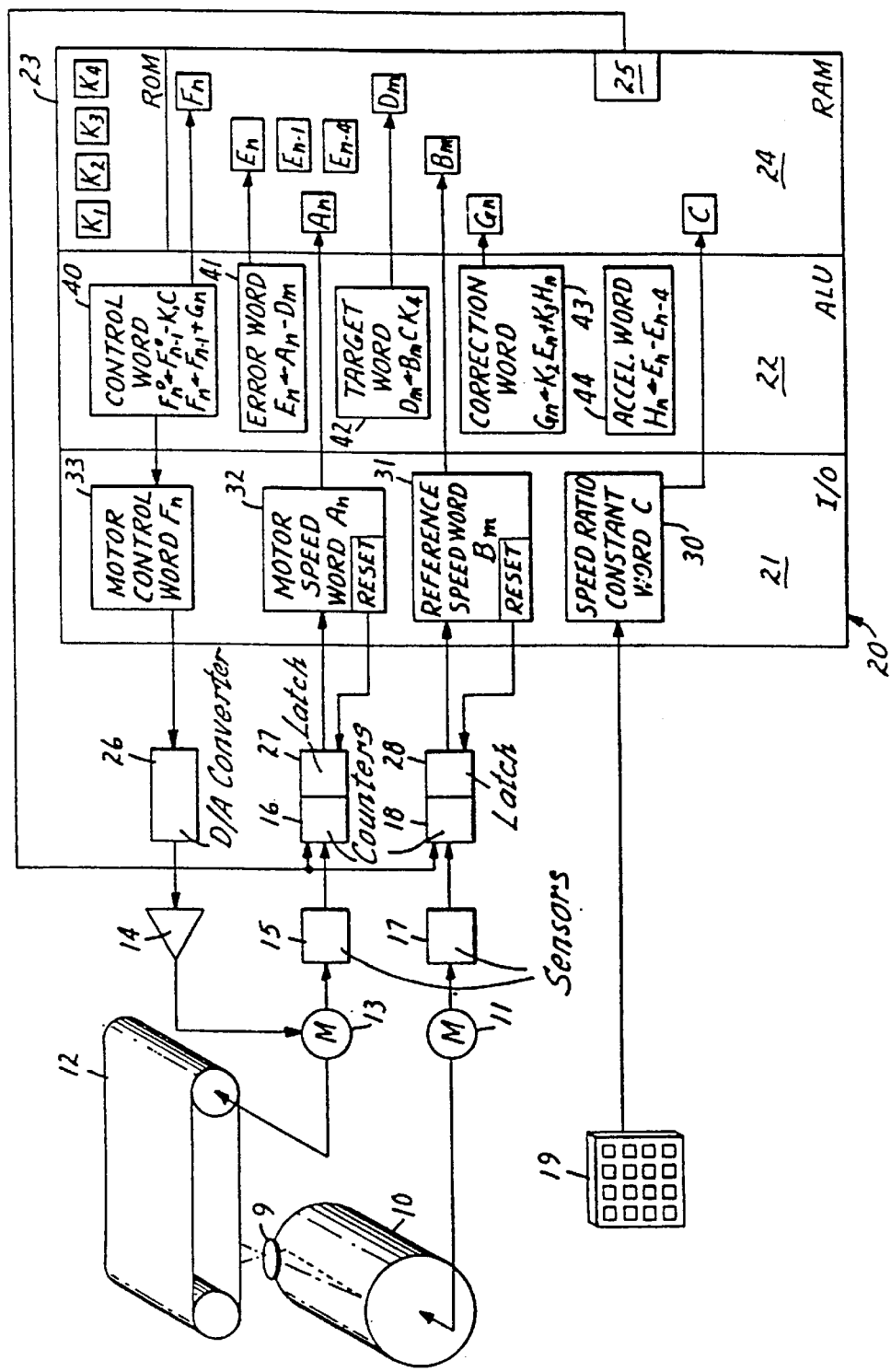
FIG. 3 is a combined block and pictorial diagram of the system of McCutcheon (U.S. Pat. No. 4,218,735).

FIG. 3 is a functional block diagram from McCutcheon, U.S. Pat. No. 4,218,735. In the block diagram, the McCutcheon controller in the preferred embodiment is applied in an example of a simple analog control application. As described in the McCutcheon patent, the variable, the speed of scan motor 13, is controlled to a reference that is a ratio of the speed of scan motor 13 to the speed of drum motor 11 with correction proportional to the difference between the variable and reference periodically made to the system input, the speed of scan motor 13 which, in this application, is also the controlled variable, i.e., the controlled variable is a direct function of system input. Initial approximation of control input to the scan motor to increase the speed thereof to a near correct speed is made by decrementing an initial control word $F^o_n$, where in block 40 it states:

$$F^o_n = F^o_{n-1} - K_1 C \qquad (1)$$

wherein $K_1$ is an empirical constant and C is a speed ratio constant.

Control is then shifted to the actual control word $F_n$, where in block 40 it states:

$$F_n = F_{n-1} + G_n \qquad (2)$$

wherein $G_n$ is a correction word, or presumed error.

Then in block 43, $G_n$ is defined as:

$$G_n = K_2 E_n + K_3 H_n \qquad (3)$$

wherein $K_2$ and $K_3$ are each an empirically derived constant, $E_n$ is an error word, and $H_n$ is an acceleration word.

Then in block 41, $E_n$ is defined as:

$$E_n = A_n - D_m \qquad (4)$$

wherein $A_n$ is scan motor speed and $D_m$ is a target word of a different clock.

Stated another way, $E_n$ is the variable minus the set point. The generation of the value $A_n$ is shown at block 32 as the result of counts per time period from a shaft speed sensor 15 of scan motor 13 via counter 16 and latch 27, and is inversely proportional to the scan motor speed.

Then in block 42, $D_m$ is defined as:

$$D_m = B_m C K_4 \qquad (5)$$

wherein $B_m$ is a reference speed word and $K_4$ is a constant.

The generation of the value $B_m$ is shown in block 31 as the result of counts per time period of the shaft speed of drum motor 11 via sensor 17, counter 18 and latch 28, and is inversely proportional to the speed of drum motor speed 11.

Then in block 44, acceleration word $H_n$ is defined as:

$$H_n = E_n - E_{n-4} \qquad (6)$$

Stated another way, $H_n$ is the change in error, $dE_c$, over four time periods, n to n−4.

To better understand the operation of the McCutcheon controller the simplified flow chart of FIGS. 4a–4b has been drawn to facilitate latter comparison with the flow chart of the present invention for the same application in FIG. 5b below. In making the flow chart of the prior art it has been necessary to offer plausible solutions for those points where the description given in the McCutcheon patent is less than complete or unworkable.

Figure 4A:
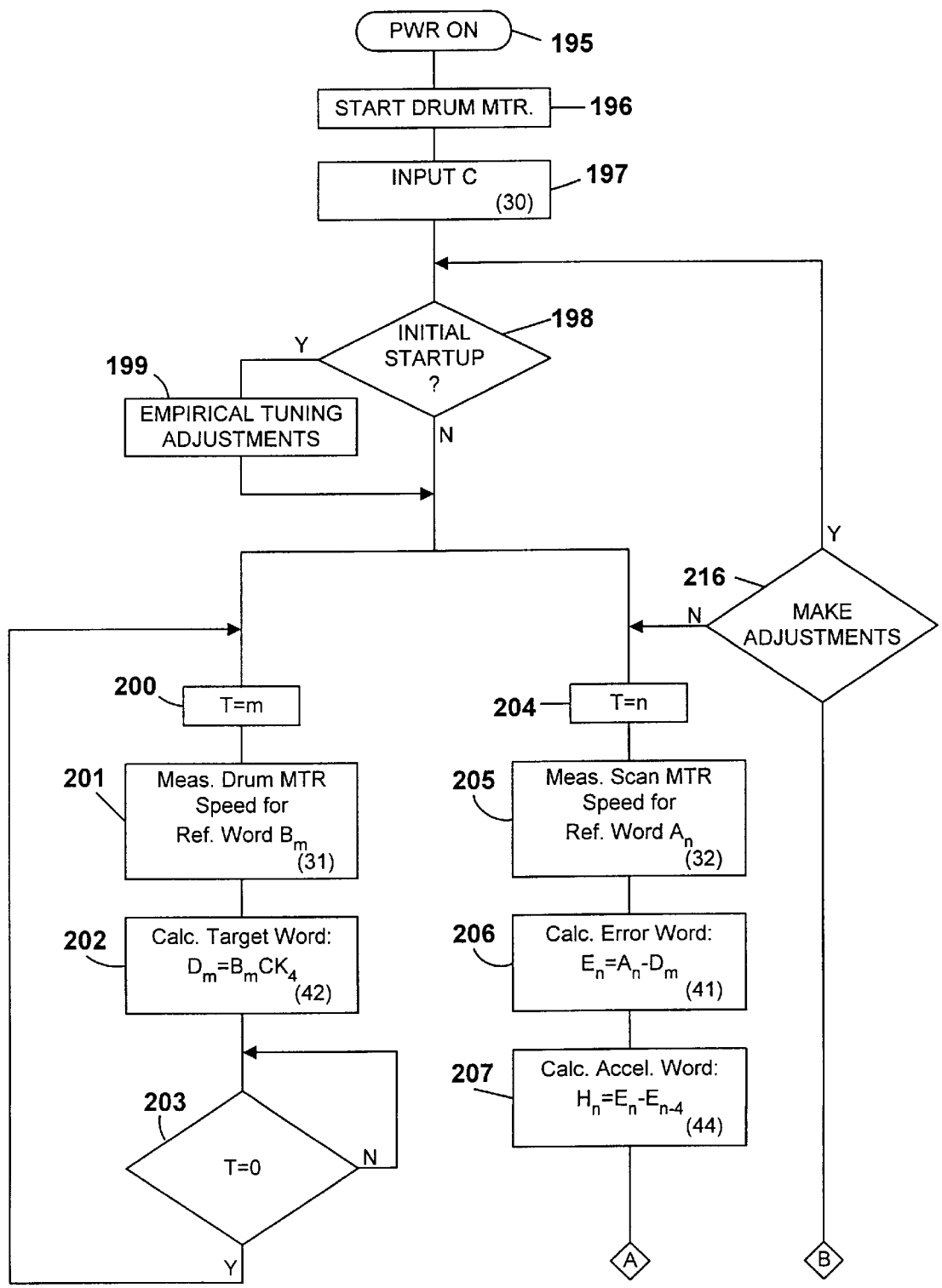
FIGS. 4a–4b is a simplified flow chart of the prior art of McCutcheon.
Figure 4B:
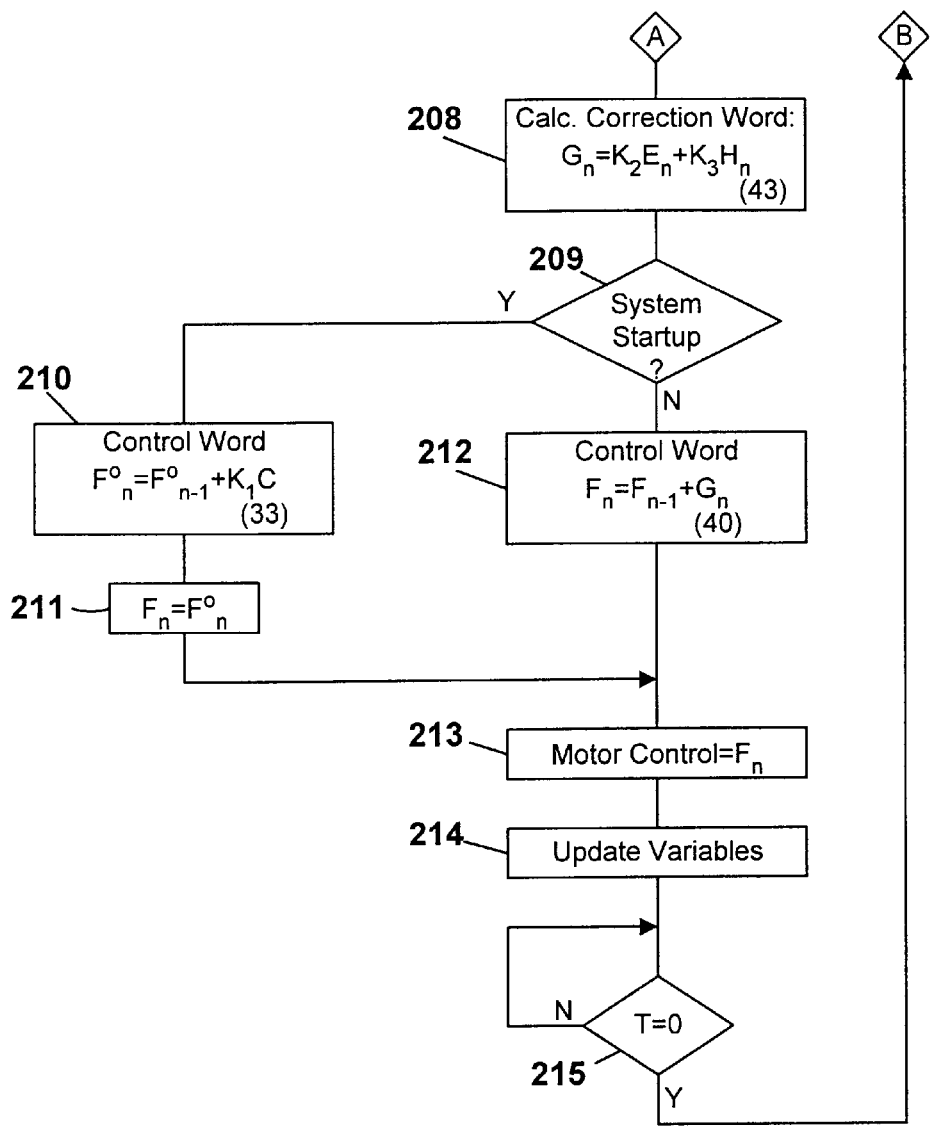

Now with reference to FIGS. 3 and 4a–4b, (reference numbers from FIG. 3 are shown within the blocks of FIGS. 4a–4b), operation of the McCutcheon controller is shown.

To start the system to which the McCutcheon controller is applied, power to the controller is first turned on (195), and drum motor 11 is started (196). Next the desired input magnification ratio, or speed ratio constant, C, of block 30 (197) is entered via the keyboard 19. If the controller is new to the application (198), initial tuning of the controller (199) to the application is required, then or otherwise operation proceeds to the determination of the times for the two timers, m (200) and n (204) (the two should be determined in parallel), and the appropriate values for the tuning constants $K_1$, $K_2$, $K_3$, and $K_4$. This requires operating the system, making adjustments, operating the system, making further adjustments, etc. Depending on the components of the system, this initial tuning may take hours, perhaps even days.

Continuing with drum motor timer, m (200), which operates separately from the main cycle timer, n (204), the reference drum motor speed block 31 (201) and target word block 42 (202), or reference set point, are determined within the cycle of the drum motor timer (203). The preset m for the drum motor timer is entered (200), then the drum motor speed is measured and stored as $B_m$ (201), next the target word $D_m$ (202) is calculated, and when the drum motor timer reaches zero, the drum motor timer is again preset to m, and the cycle is repeated beginning at 200.

Concurrently the operation of the scan motor and other operations of the McCutcheon controller are completed within the cycle of a main cycle timer with a preset n. The preset n for the main cycle timer is entered (204), then the scan motor speed is measured and stored as $A_n$ at block 32 (205), the present Error Word, $E_n$, is calculated at block 41 (206) [Notably, the time bases m and n are different, i.e., the measurements of the two speeds are taken at different times over different time periods, so the present Error Word may not be the present error], followed by calculation of the acceleration word, $H_n$, at block 44 (207) [Note the resultant value of $H_n$ is a comparison of the error of the present cycle to the error three cycles previous.], and then the correction word, $G_n$, is calculated at block 43 (208).

Just how the transition is made from startup to run is unclear from the description in McCutcheon, U.S. Pat. No. 4,218,735. When the transition is made is also a bit ambiguous. Shown next is a plausible way of making this transition using the implied manual transfer of McCutcheon.

If the mode of operation is startup (209) in FIG. 4b, then the initial control word is $F^o_n$ as in block 33 (210). Somehow, during this time $F_n$ is set equal to $F^o_n$ (211).

If the mode of operation is not startup (209), then $F_n = F_{n-1} + G_n$ as in block 40 (212).

Then in either mode of operation, control word $F_n$ is stored as the motor control word (213) for output via D/A (Digital to Analog) converter 26 to control the scan motor speed.

Although not discussed in McCutcheon, all of the variables need to be updated (214) before beginning the next main time cycle. When the cycle timer reaches 0, tuning adjustments are made (216), t is reset to n, and the cycle is repeated (205).

Some of the shortcomings of the McCutcheon controller of the prior art are that it is not self tuning, it can not do an automatic startup, it is awkwardly matched to system response time, it controls on the basis of what has happened, it is awkward to use in the application of the given example, and it would be of little use for applications other than those most similar to that given.

In McCutcheon the speed ratio constant, C, is the only tunable control parameter accessible via the keyboard (see FIG. 3), per McCutcheon's description. The other, empirically derived, tuning constants: timer presets n and m, $K_1$, $K_2$, $K_3$, and $K_4$, shown stored in ROM 23, are somehow changeable but that is not discussed by McCutcheon. These serve to tune the McCutcheon controller to the system of application. To tune the McCutcheon controller to the application would require many runs requiring many hours and perhaps days. During each of these runs, changes would be made to one or more of the empirically determined constants, operation observed, changes made, etc.

Each time the system is started, the McCutcheon controller brings the variable, the scan motor speed, to near the desired speed of operation with incremental adjustments to a temporary value for output, then speed control is transferred to the actual value for controller output. An example is given of eleven increments, each of 8 msec., for the acceleration of the scan motor from stopped to approximate operating speed. All the increments of increase to the scan motor seed are equal, so there is no smooth acceleration from zero speed nor smooth deceleration to approximate operating speed provided. It appears, the McCutcheon controller of the prior art can not automatically bring the speed of the scan motor from start to set point, i.e., manual transfer to the run mode is required. The variable, scan motor speed, needs to be brought to near operating speed because the McCutcheon controller can only control the variable scan motor speed to set point when the variable is at or near set point. Though the cycle time, n, for the McCutcheon controller is, implicitly, approximately 8 msec. the controller makes little note of the importance of time to the controller operation, never directly addressing the need for matching controller cycle time to system response time. Having the acceleration word, $H_n$, equal $E_n$ minus $E_{n-4}$, or other previous error, speaks to this need to address the response time of the system. Controlling on error only, the output of the McCutcheon controller is perforce premised on the past. Using information from four cycles previous only makes that past more distant the present happenings in the system. Moreover, the different time basis for the reference target word, $D_m$, and the controlled variable, $A_n$, causes an oscillatory control word, $F_n$. Such oscillations would be significant in any applications where the error change was uneven within the slower clock period.

The present output of the McCutcheon controller is the sum of previous output and a correction word with the correction word being equal to the sum of multiples of the present error and a less than present change in error. As present error is previous error plus present change in error, output is the sum of: the previous error, the present change in the error, and a less than present change in error. Further, the McCutcheon controller acts to bring the variable to set point with changes to output based on error. These changes to output are premised on accumulated error plus however much the accumulated error increased or decreased over the past three cycles of operation. If the cycle time, n, is a good approximation of the system response time, $K_2$ is a good conversion of error to output, $K_3$ is a good conversion of error to output, and neither the load nor set point change; the change made to output by the McCutcheon controller is a good approximation of that needed to bring the process variable equal set point. The McCutcheon controller knows what the process variable and the set point are, and the relationship thereof (i.e., McCutcheon knows the value of E, the error). The McCutcheon controller does not know if the load is changing or has changed (i.e., McCutcheon does not know dE, the rate of change of the error, he approximates a value that is similar to dE without the variable to set point. It can only control the variable closely to set point when the variable is near set point, and load changes are small and not continuous.

Figure 1:
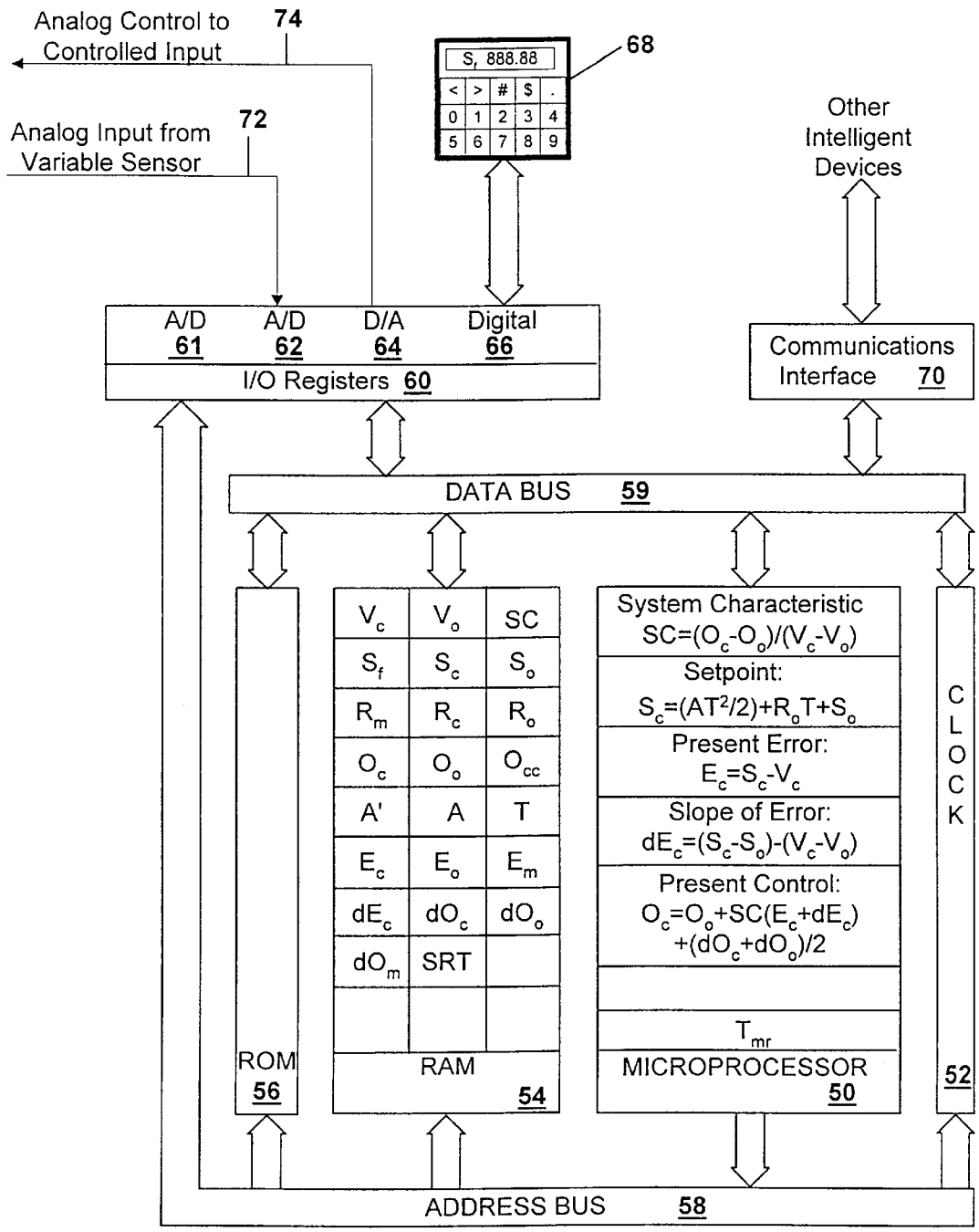
FIG. 1 is a block diagram of an embodiment of the controller of the present invention.

With reference to FIG. 1, the controller of the present invention is depicted in block diagram form. The controller as shown is comprised of a microprocessor 50 that is connected via both address bus 58 and data bus 59 to clock 52, non-volatile RAM (Random Access Memory) 54, ROM (Read Only Memory) 56, and input/output (I/O) registers 60. Also connected to data bus 59 is communications interface 70. Connected to I/O registers 60 are analog to digital (A/D) converters 61 and 62, digital to analog (D/A) converter 64, and a digital I/O port 66. In-turn, connected to digital I/O port 66 is operator interface keyboard and display 68. Also shown are an analog input signal 72 from a process variable sensor (not shown) in the system under control being received by A/D converter 62 for storage in RAM 54, via I/O registers 60 and data bus 59, as the present variable, $V_c$; and an analog output signal 74 to the controlled input of the system under control, via data bus 59, I/O registers 60 and D/A converter 64, representing the present output signal, $O_c$, as stored in RAM 54.

The variable sensor (not shown) in the system under control might be a thermocouple, pressure or flow transducer, encoder, etc., located so as to accurately sense the variable, and might produce an output signal in millivolts, milliamps, volts, etc, and this signal might be either a continuously variable or digital representation of the variable. The controlled analog output signal, $O_c$, might be in millivolts, milliamps, volts, etc., and this signal might be either continuously variable or digital, and the controlled variable input device might be a positioning valve or damper to control flow, a variable frequency drive for an AC motor, etc.

Operator interface in the form of input and readout is implicit for all parameters including the display thereof in standard engineering units for all embodiments whether shown or not. The range of each parameter, including the inputted analog or digital signal representing the controlled variable and the outputted analog or digital signal to the control device for system input, is scaled to the capacity for resolution of the machine of calculation (employed microprocessor, computer, programmable controller, etc.).

Figure 2A:
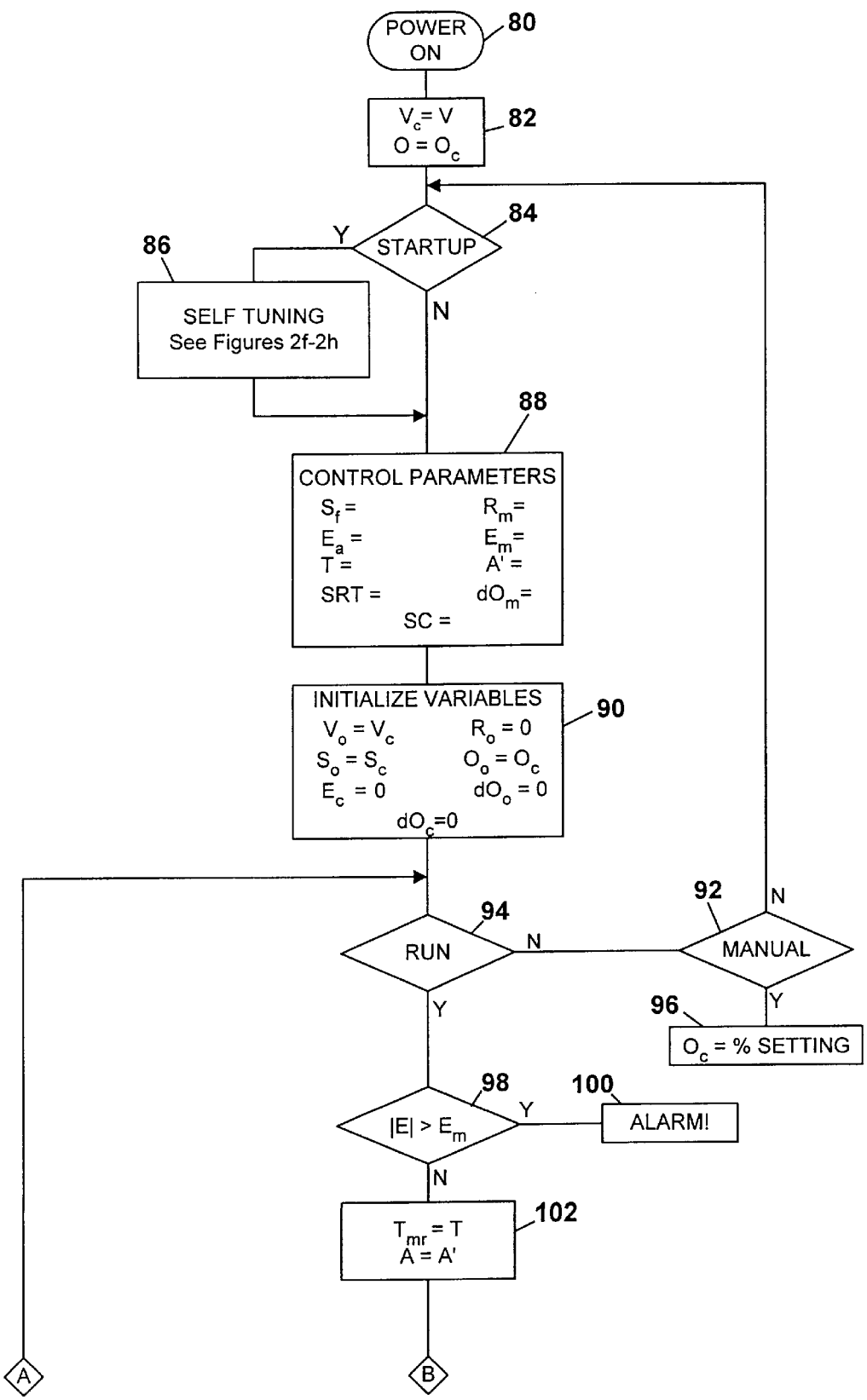
FIGS. 2a–2c is a flow chart of the functions of the embodiment of the controller of the present invention.
Figure 2B:
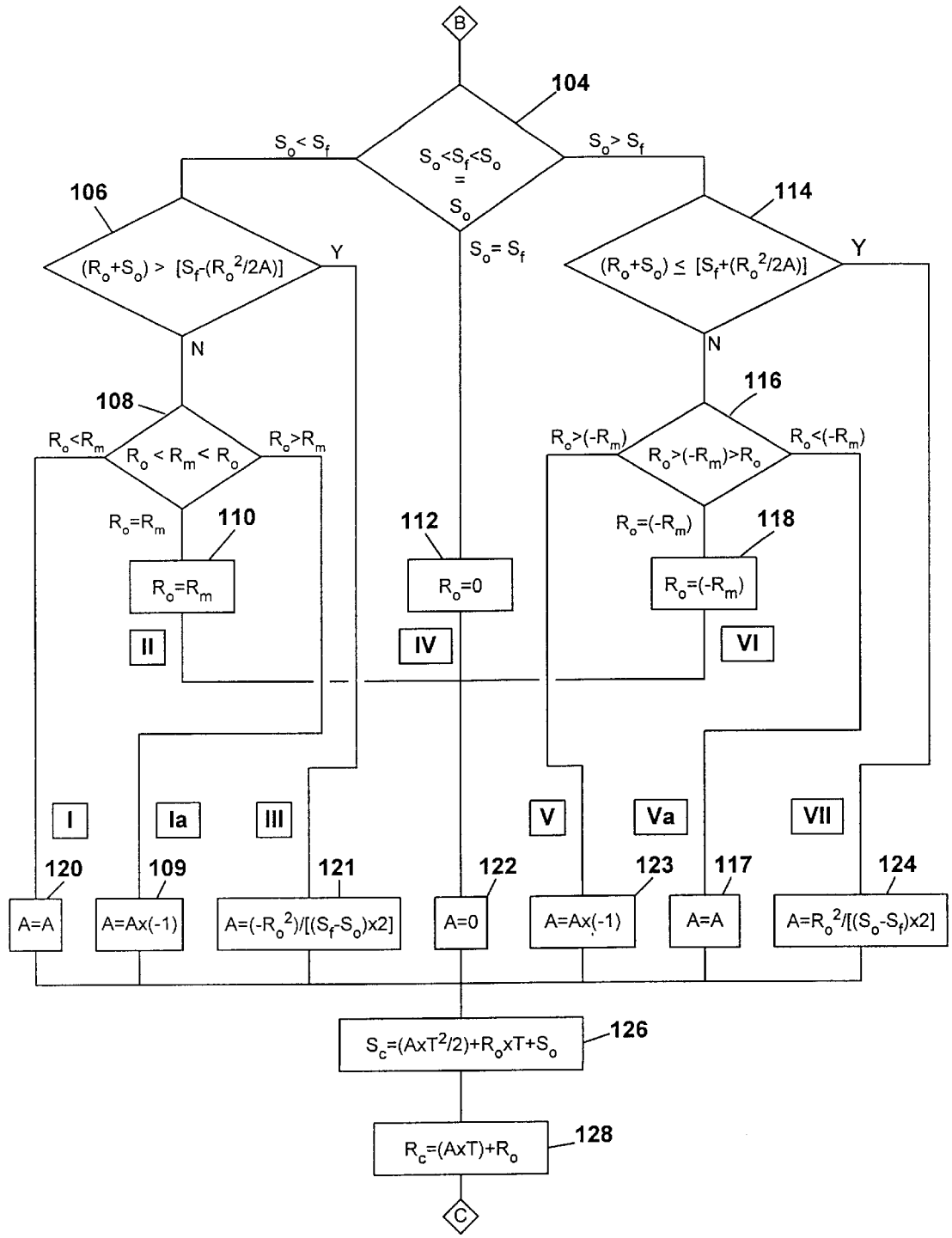
Figure 2C:
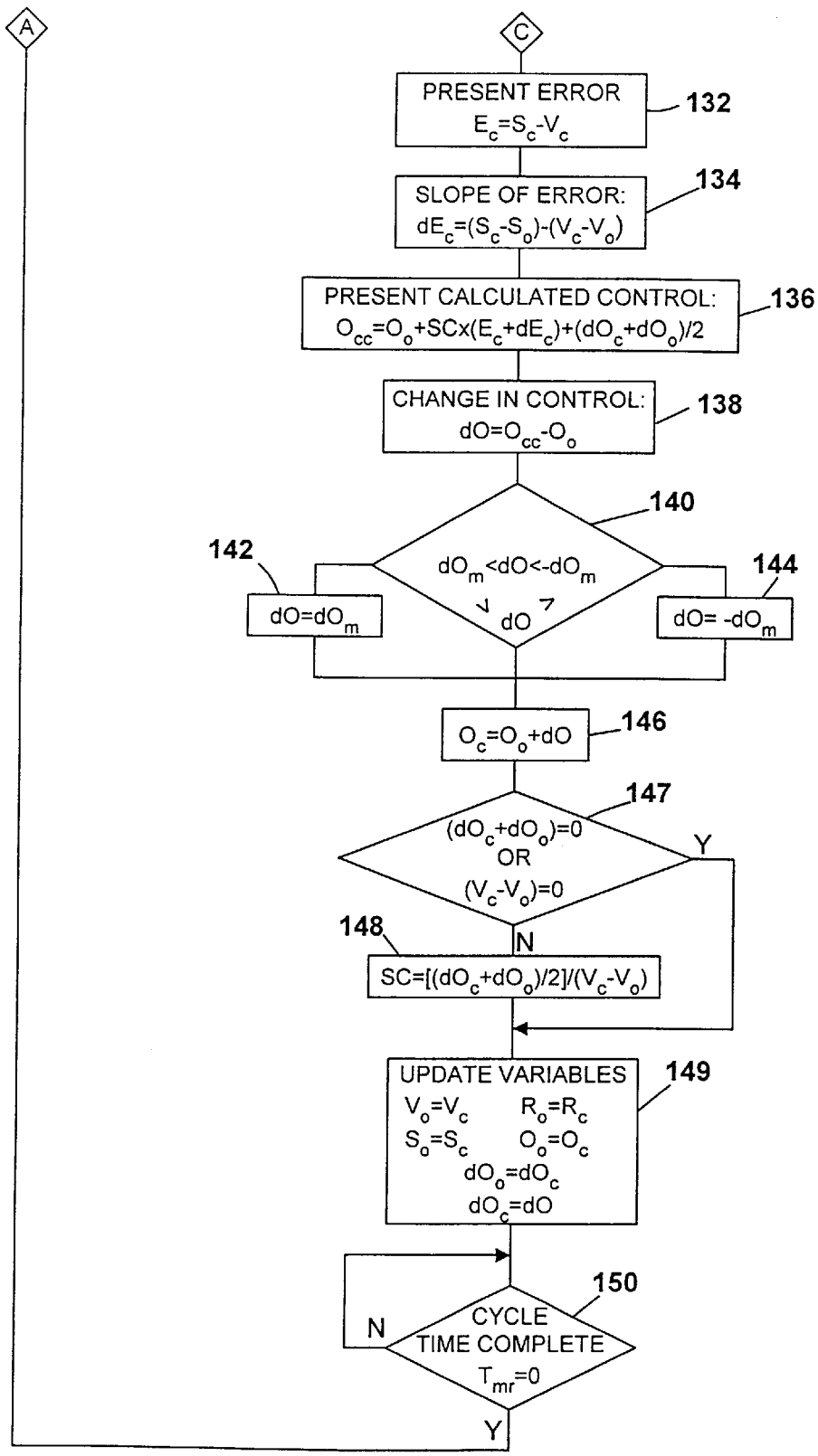

The operation of the controller of the present invention is most easily understood by referring to the operational flow chart of FIGS. 2a–2c together with the physical block diagram of FIG. 1. In the following discussion of the flow chart of FIG. 1 the block reference numbers are shown in parenthesis. See Table I for a definition of terms for the present invention.

The control scheme depicted in the block diagram of FIG. 1 and the flow chart of FIGS. 2a–2c is that for applying the controller of the present invention to a closely coupled system. Differences between this scheme and the one used for applying the controller of the present invention to a less than closely coupled system (i.e., a buffered system), or a system of slow response to changes in input are denoted and delineated as they occur in the description.

Now with reference to both FIGS. 1 and 2a, if power is on (80), initially the present output signal, $O_c$, is set to zero. Thereafter, the controller continuously stores the digital equivalent of the process variable analog input signal 72 as the present process variable, $V_c$, in the RAM 54, and continuously outputs the analog equivalent of the present output signal, $O_c$ from RAM 54 as analog output signal 74 (82).

Before the controller of the present invention is first placed in full operation, an initial self tuning cycle, for adapting the controller to the particular application, should be completed. Before performing this tuning cycle, the system is brought to an initial condition in MANUAL (operation in MANUAL is described below), then, when STARTUP is initiated (84), the controller commences the self tuning cycle (86).

The tuning parameters: cycle time, T; system response time, SRT; and system characteristic, SC, adapt the operation of the controller to a particular application. The values for: cycle time, T, system response time, SRT, and system characteristic, SC, and the limit for maximum change in controller output, $dO_m$, are system appropriate and are determined or entered during the self tuning cycle (86).

A system consists of one or more components operating as a unit to perform a certain function. A steam boiler is a system which produces steam, a conveyance system moves people or cargo, an electric power plant produces power, etc. The function performed by a system is oft referred to as its load, and the amount of function performed is spoken of in the units of loading be they per cent, kwh, pounds per hour, feet per second, etc. An unloaded system is at 0% load, whatever the units of load (i.e., an unloaded system is performing none of the function of purpose). An unloaded system may be moving, at temperature, at pressure, etc. (i.e., the process variable could be at any level within its range in an unloaded system). The system is steady state when the process variable, system input, and system load are unchanging.

The cycle time, T, and the system response time, SRT, together adapt the controller to the response time of the system of the application. When operating in the RUN mode, as will be seen below, the controller repeats a cycle of sequentially updating set point, measuring present error, determining present slope of the error, determining the change in load, calculating a present value for output, and updating all variables.

For a close coupled system, the cycle time needs to be long enough for the controller to sense a change in the process variable and perform the calculations and other operations of a cycle, but should be no longer than necessary since the longer the period, the slower the controller response to system changes. Too long a period unduly limits system operations. The system response time, SRT, needs to be long enough for the controller to measure the present change in the system process variable due to a previous change in output (system input). The cycle time, T, and the system response time, SRT, may be the same for a close coupled system. The cycle time and the system response time may vary for each system to which the controller is applied for several reasons. For example, a system process variable sensor does not immediately detect and transmit to the controller a change in process variable. The time required is a function of the sensor location, process flow rates, sensor response time, etc. Also, a change in controller output does not immediately change system input since the system input control device receiving the controller output signal changes system input at some rate, resulting in a time lag between the change in controller output and the change in system input. There is a time lag between a change in system input and a resultant one in the process variable, due to buffering, acceleration times for mass, mixing rates, etc. The load may change as a result of input change. The control accuracy and response are dependent on the cycle time and system response time.

For a close coupled system; if the cycle time, T, for the controller of the present invention is twice the time for detection of an induced change, during normal operation, at the start of each cycle, the controller detects change in the process variable due to approximately the first one-half the present change in output, $dO_c$, and approximately one-half the previous change in output, $dO_o$. If the cycle time, T, were less than twice the change detection time, the controller would see less of the present change in process variable due to the present change in output, $dO_c$, and more of the change due to the previous change in output, $dO_o$. For an example of this trend, if the cycle time, T, were equal the change detection time, none of the present change in process variable measured at the beginning of a cycle would be due to the present change in output, $dO_c$. The detected change would be due instead to the two previous changes in output, $dO_o$ and $dO_{o-1}$. If the cycle time were more than twice the detection time, the controller would detect more of the present change in process variable due to the present change in output, $dO_c$, and less of the change due to the previous change in output, $dO_o$. Thus there is an implicit trade off between controller response time and the accuracy of the response. A controller that waits for a very accurate measure of the change in process variable due to the present change in output would be a very slow controller. For most applications, twice the detection time is a good approximation of the cycle time; affording excellent controller performance. There are applications, however, where other values for the cycle time, T, might notably enhance controller performance. For such applications, the best value for the cycle time, T, should be determined empirically.

For a system that is less than closely coupled (i.e., a buffered system) or a system of slow response to changes in input, the cycle time, T, is less than the system response time, SRT. For systems less than closely coupled the system response time, SRT, remains premised on the amount of time required for a change in system input to produce a change in the process variable, as above. However, the cycle time, T, only includes the time required for the controller to sense a change in the process variable and perform the calculations and other operations of a cycle. The number of cycles occurring within a system response time, is used by the controller of the present invention in proportioning changes in output due to error.

To determine the time required to see a change in the process variable due to a change of controller output, i.e., the system response time, SRT, with the system in a suitable initial condition, the controller of the present invention makes a small increase in output (system input), then measures the time until an increase in the process variable is detected. This time between initiation of the change in output and the controller detecting an increase in process variable includes the sensor response time, the time lag between controller output and system input, and the time lag between change in the system input and the process variable.

The units of measure for error and controller output are invariably different. The units of measure for error are those of the controlled analog variable (the process variable), e.g., degrees centigrade, meters per second, etc., while those of the output are often per cent. The control ranges for the two are almost always different, e.g., the output range may be 0–100% and the process variable −50 to 150° C.

The system characteristic, SC, the ratio of a change in system input (controller output) to a change in process variable resultant this change in input, is used by the controller of the present invention to convert values of error into equivalent values of output. When operating in the RUN mode, as is discussed below, the controller of the present invention uses the system characteristic, SC, to convert the values of present error and present change of error into equivalent values of output. During each cycle, the converted value for the present error is added to the present change in load as determined by adding the converted value for the present change in error to the just previous changes in output. These values, present error converted to output and present change in load added to previous output yield the value for the present output signal, $O_{cc}$, that is calculated as follows:

$$O_{cc} = O_o + SC \cdot E_c + SC \cdot dE_c + [(dO_c + dO_o)/2] \quad (7)$$

=(previous output)+(converted present error)+(converted change in error)+(change in output)

where:

$O_o$ is previous output;

$E_c$ is present error;

$dE_c$ is present change of error;

$dO_c$ is present change of output; and $dO_o$ is previous change of output.

SC is system characteristic

Two ways of performing the self tuning cycle are described below. One requires that the system to be controlled be at steady state and unloaded. The other only requires that the load be unchanging.

It is possible to determine the system response time, SRT, and the system characteristic, SC, for a system that is at steady state and unloaded. To determine the time required for the controller to detect a change in the process variable due to a change in system input, the controller of the present invention initiates a given low level (e.g., ≦5.0%) increase in output signal 74 and measures the time until the present process variable, $V_c$, begins to change, i.e., the time required to detect a change in the process variable due to a changed output. This is the system response time, SRT. Upon detecting the increase in the process variable, the controller determines the time to detect a change, records this time, stores the value of the variable $V_c$ as $V_o$, waits the same time measured to detect the increase, and notes the value of the variable $V_c$ again. The controller also records both the initial level of output, $O_o$ and the level to which output is increased, $O_c$, and then calculates SC as follows:

$$SC=(O_c-O_o)/(V_c-V_o) \qquad (8)$$

where:

$O_c$ is the level to which the output increases;

$O_o$ is the initial level of the output;

$V_c$ is the present process variable; and $V_o$ is the previous process variable.

It is also possible to determine the system response time, SRT, and the system characteristic, SC, for a system that is not at steady state. To do so, the system load must be unchanging. With the system application at no load or at a constant load, and with a given controller output; the initial rate of change in the variable is determined. Once the initial rate is determined, the controller output is changed and a clock is started. Now, the rate of change of the variable is continuously monitored, and compared with the initial rate. The time required for the change in output to produce a change of the rate of change in the variable, as measured by the clock, is the system response time, SRT. SRT, once determined, is used in determining the system characteristic, SC. During a time equivalent to SRT, the rate of change of the variable is again measured. The difference between this just obtained rate of change of the variable and the initial rate of change of the variable is converted to the change in the variable over SRT, by multiplying this difference by SRT. Finally, the change in output is divided by the change in variable to obtain SC.

Figure 2D:
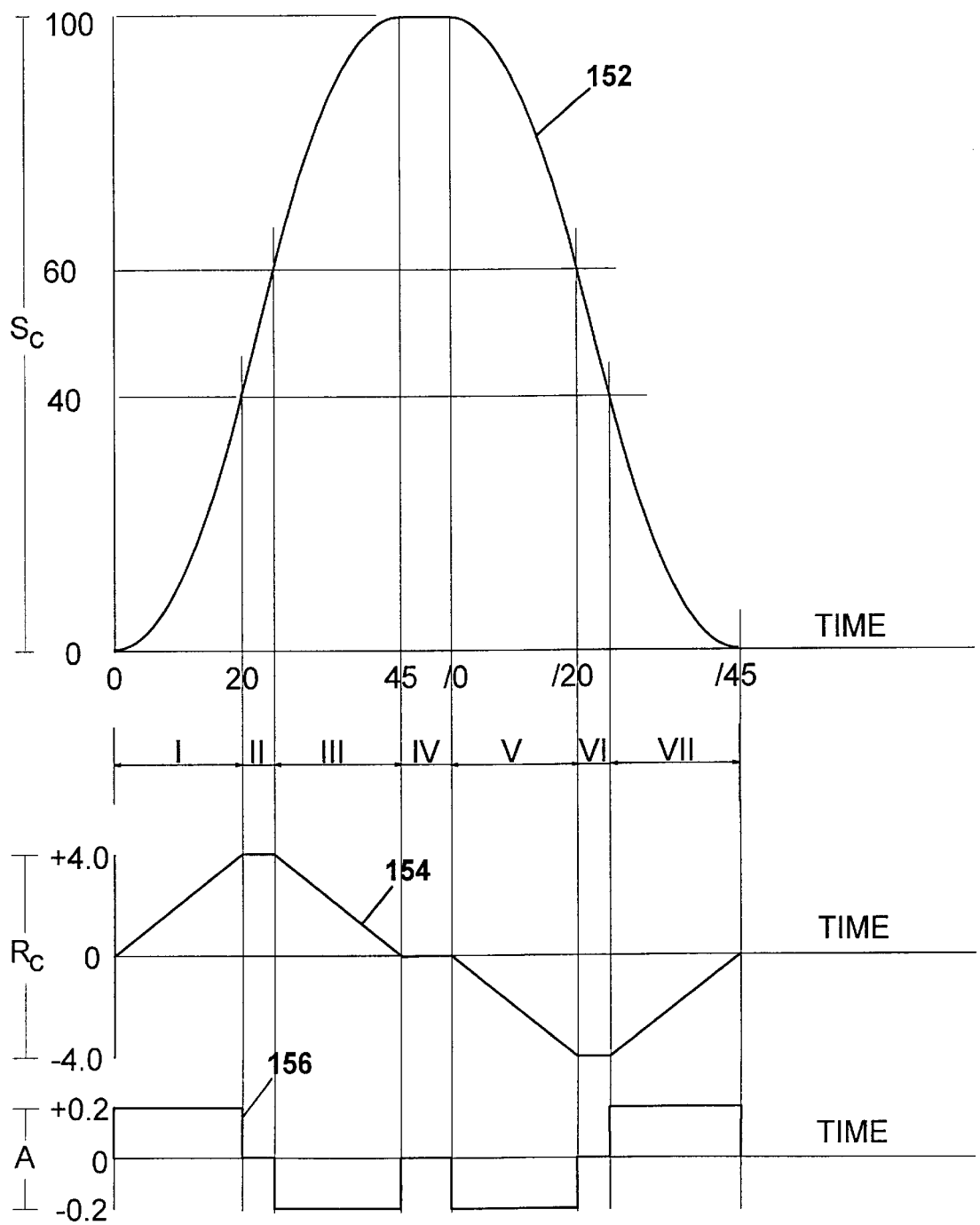
FIG. 2d is a graph depicting an example of set point generation by a controller of the present invention as described in FIG. 2b of the flow chart of FIGS. 2a–2c.
Figure 2E:
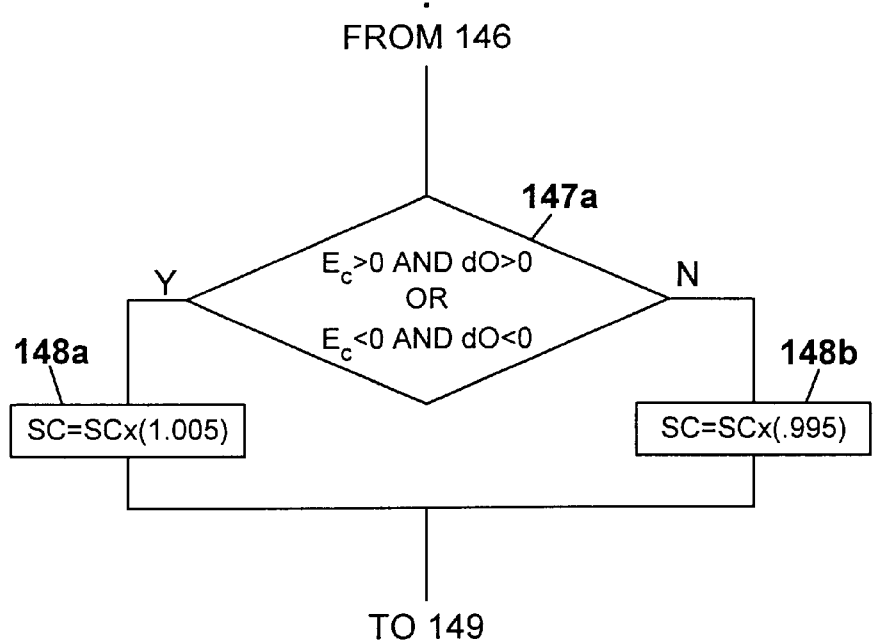
FIG. 2e is a modification to the flow chart of FIG. 2c for a system that is not closely coupled making the calculations of the present invention.
Figure 2F:
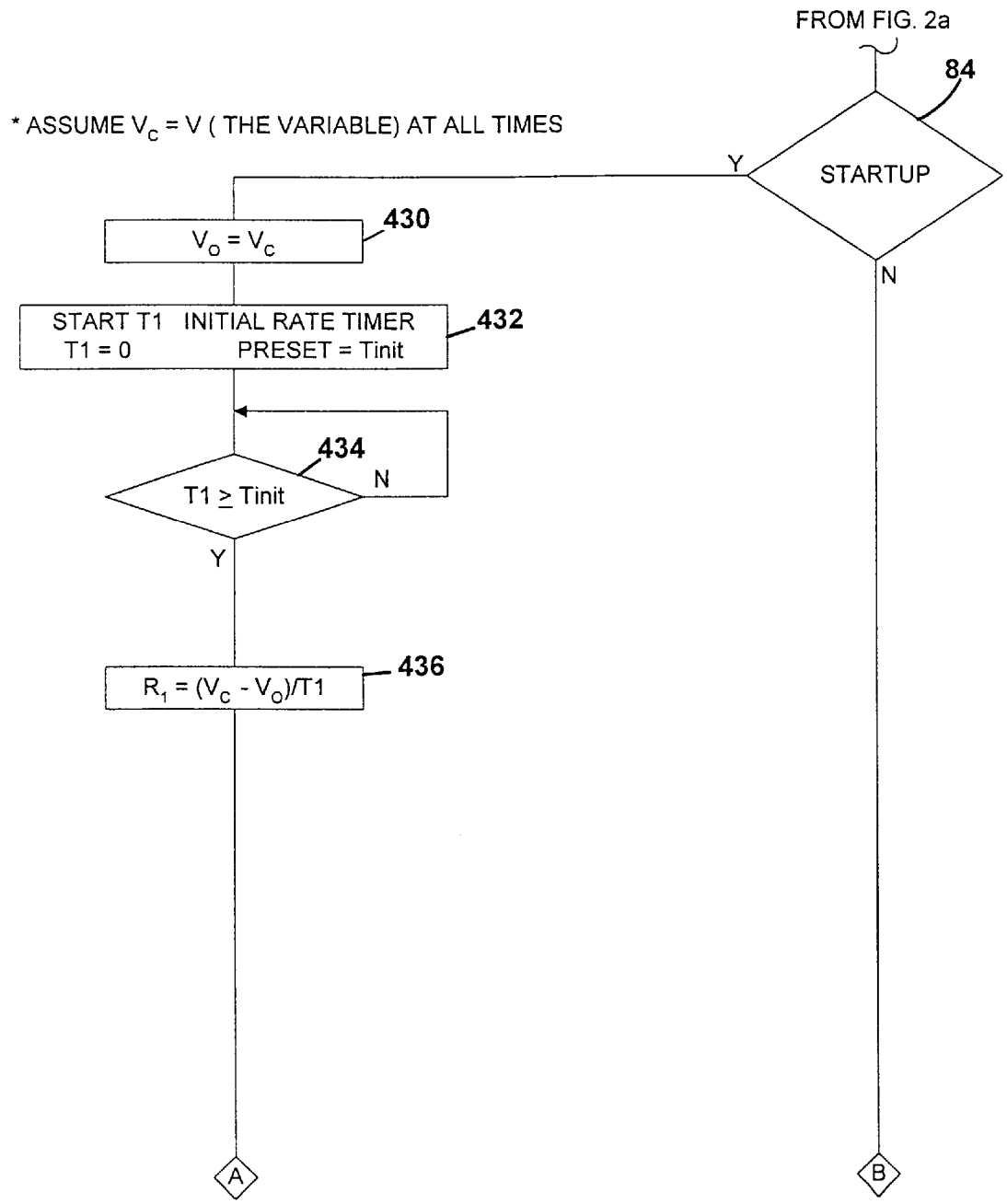
FIGS. 2f–2h is a flow chart of a self tuning cycle for the controller of the present invention.
Figure 2G:
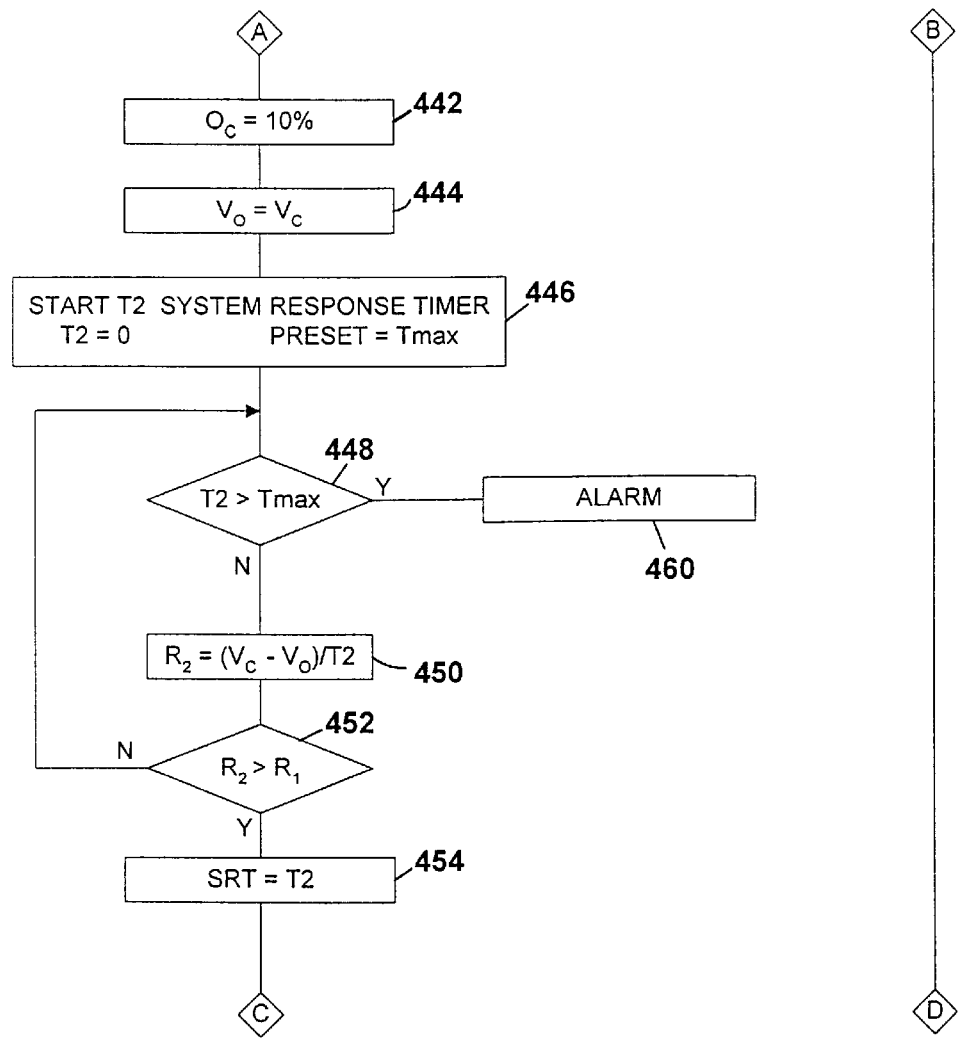
Figure 2H:
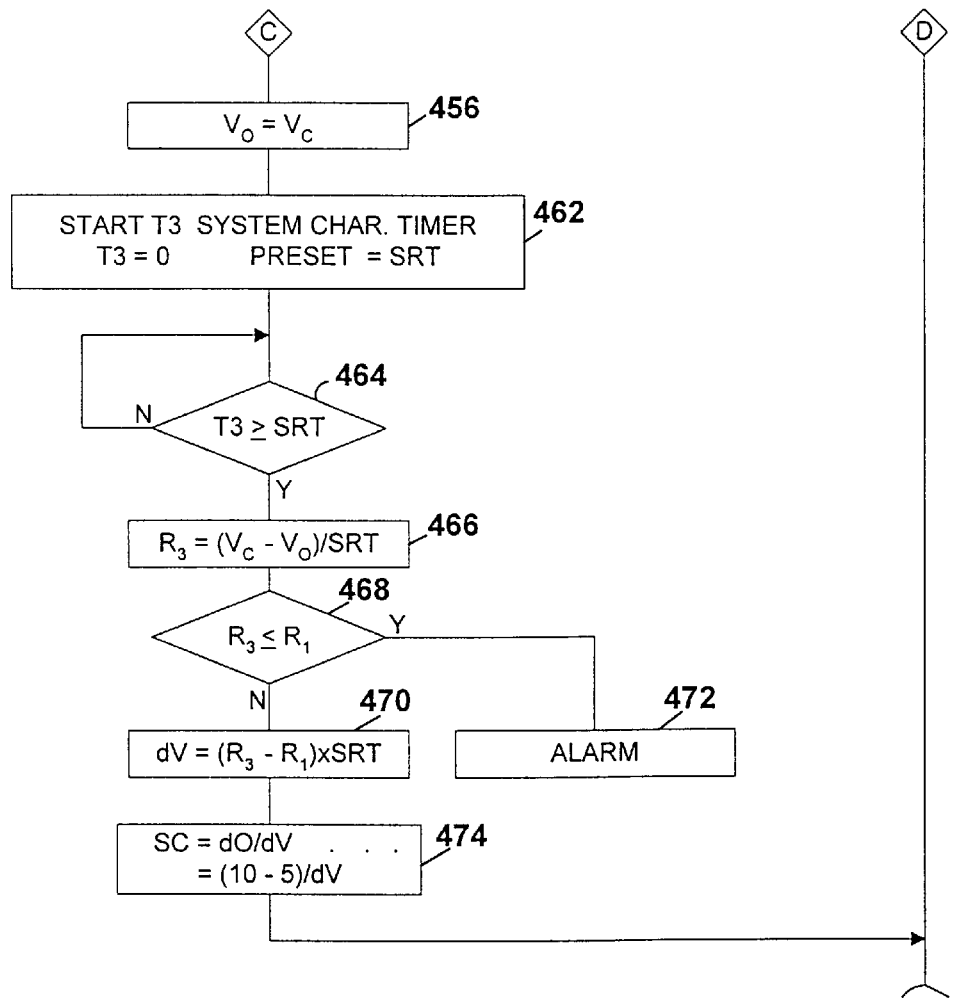

Referring now, also, to the flow charts shown on FIGS. 2f, 2g, and 2h: With the system load unchanging and with a controller output of 5%, or some other value, as established in MANUAL, when STARTUP is initiated (84), the self tuning cycle begins (86).

Now with reference to FIG. 2f, the initial value for the variable, $V_o$, is stored in memory for subsequent comparison with the current value of the variable, $V_c$, as shown at block 430. Note, $V_c$ is equal the actual value of the variable, V, at all times. Then, a clock, the initial rate timer, T1, is started for use in the measurement of an initial rate (432). In recognition of the fact that the rate might be zero, or so small as to be within the margin of error of the equipment or even so small as to be meaningless; T1 has a present of some maximum value, Tinit. If T1 is less than Tinit (434), T1 continues to run. If T1 is not less than Tinit (434), then the initial rate, $R_1$, is determined by dividing the change in the variable, $V_c-V_o$, by the amount of time that has accumulated on T1 (now Tinit) (436). Then, the controller proceeds to the next step, the determination of the system response time, SRT.

Now with reference to FIG. 2g, preliminary the determining of SRT; the current output, Oc is increased to 10% (442) (10% being a selected value that could be any other value a user may desire), and Vo is set equal Vc (444). Then a clock, the system response timer, T2, is started for use in the measurement of SRT (446). Should the change of output be insufficient to produce a change in the variable, or, for whatever reason, results not be obtained in a reasonable amount of time; T2 is shown with a preset of some maximum value, Tmax. If T2 is greater than Tmax (448), an alarm (460), could be provided to alert the operator that the determination of SRT has failed. If T2 is less than or equal Tmax (448), the rate used in determining SRT, $R_2$, is determined by dividing the change in the variable by the amount of time that has accumulated on T2 (450). Now, the rate $R_2$ is compared with the earlier determined $R_1$ (452). If $R_2$ is less than or equal $R_1$, T2 continues to run and the cycle, beginning at (448), repeats. If $R_2$ is greater than $R_1$, SRT is set equal to T2 (454), then, the controller proceeds to the next step, the determination of the system characteristic, SC.

Looking now to FIG. 2h; preliminary the determining of SC, $V_o$ is set equal $V_c$ (456). Then, a clock, the system characteristic timer, T3, is started for use in the measurement of SC (462). T3 has a preset equivalent SRT. The clock, T3, continues to run until it times out, i.e., it reaches its preset, SRT (464). Then, the rate of change of the variable during the period of the clock is determined, $R_3=(V_c-V_o)/\text{SRT}$ (466). If $R_3 \leq R_1$ (468), an alarm (472) could be provided to notify an operator that the determination of SC was unsuccessful. If $R_3>R_1$ (468), then the differences in the rates $R_3$ and $R_1$ is converted to the change in the variable, $dV=(R_3-R_1)\times\text{SRT}$ (470). Then, $SC=dO/dV$ (474), with do being the change in output made above, e.g., 5% (this value is also user selected).

The cycle time, T, is the preset value for the timer, $T_{mr}$, performed by microprocessor 50. The values for T, SRT, and SC are stored in RAM 54 for use during the RUN cycle (94). The limit for change in output, $dO_m$, should be no more than necessary for the desired maximum rate of change for the system, should allow for any anticipated response requirements, should preclude overloading the source of system input and is stored in RAM 54. In the startup cycle, the limit for $dO_m$ is entered manually. The limit for changes in output is derived from the capacity of the source of system input such as the steam boiler, electric power supply, etc. The limit per cycle is this system limit converted to cycle time. For example: the capacity of the input source is 10 units of input per minute and the controller cycle time is 0.5 seconds per cycle, then:

$dO_m=(0.5 \text{ sec./cycle})\times(10 \text{ units/min.})\times(1 \text{ min./60 sec.})$ $dO_m=0.833 \text{ units/cycle}$ Unless changes are made to the system of application, the controller of the present invention requires no further tuning beyond the ascertainment of these parameters.

The initial tuning is now complete and control is returned to the normal flow path in FIG. 2a.

The control parameters, entered via keyboard and display 68 or communications interface 70, are stored in RAM 54 for use in succeeding calculations (88). They may be changed at any time. The desired final set point, $S_f$, represents the desired final set point for a given set of input parameters, and the maximum rate, $R_m$, is the maximum of the rate of change for the present set point, $S_c$. The acceleration A' is the base rate of change of the present rate, $R_c$, and the error values for alarm are $E_m$ and $E_a$. The cycle time, T, the preset value for the scan timer, $T_{mr}$, and thus the length of each cycle, is entered manually. The system response time, SRT, can either be provided by the startup cycle, or be entered manually. Likewise, the system characteristic, SC, can be provided by the startup cycle or be entered manually The value for $dO_m$ is entered manually.

Next, the variables of control are initialized (90) with initial process variable, $V_o$, set equal $V_c$; initial set point, $S_o$, set equal $V_c$; initial output, $O_o$, set equal $O_c$; initial change of set point rate, $R_o$, set equal zero; present error, $E_c$, set equal zero; and present change in output, $dO_c$, and previous $dO_o$ each set equal zero.

If the controller of the present invention is in MANUAL (92), the present output, $O_c$, is entered (96) as provided via the keyboard/display 68, or the communications interface 70.

If the controller of the present invention is in RUN (94), the cycle of operation begins by testing the absolute value of present error, $E_c$, to determine if it exceeds either of the alarm points, $E_a$ or $E_m$, (98). If it does, an alarm is provided (100), otherwise the cycle continues by loading the scan timer preset, $T_{mr}$, with the preset value, T, representing the length of each scan and commences timing down to zero, and the base acceleration, A', is stored as the present acceleration A (102).

Referring now to FIG. 2b the RUN cycle continues with the controller of the present invention providing for the local generation of set point per a set of parameters by the user via the keyboard and display 68, or the communications interface 70. As noted above, these parameters can be changed at any time.

The controller of the present invention provides for smooth, controlled changes in set point with the rate of change of set point increasing from zero at the start of the change and decreasing to zero at the end of the change. In each cycle, the controller determines whether the present set point, $S_c$, should be greater than or less than the previous set point, $S_o$, i.e., is the previous set point, $S_o$, greater or less than the final set point, $S_f$ (104). In each cycle, the controller also determines whether the rate of change in set point, $R_o$, should be increased, decreased, limited, or kept the same. Additionally, the acceleration, A, can be either positive or negative, and varied as required to change the rate $R_o$, to smoothly change the present set point, $S_c$, to equal $S_f$. The requirement of smooth change of present set point, $S_c$, is most obvious for vehicular control applications, however it applies to all applications. The roman numerals shown in the lower portion of FIG. 2b represent the zones as depicted along the time coordinate of the graph of FIG. 2d for the plot of present set point, $S_c$, versus time (zones Ia and Va are not shown on FIG. 2d).

Referring again to FIG. 2b, if:
$S_o < S_f$ (104),
and $(R_o + S_o) \leq [S_f - (R_o^2/2A)]$ (106),
and $R_o < R_m$ (108);
then A=A (120) in zone I,
increasing $S_c$ (126) and $R_c$ (128).
Alternatively, if $S_o < S_f$ (104),
and $(S_o + R_o) \leq [S_f - (R_o^2/2A)]$ (106),
and $R_o \geq R_m$ (108);
then $R_o = R_m$ (110) in zone II,
A=0 (122),
increasing $S_c$ by $R_m T$ (126), and $R_c$ is unchanged (128).
Alternatively, if $S_o < S_f$ (104),
and $(S_o + R_o) \leq [S_f - (R_o^2/2A)]$ (106),
and $R_o > R_m$ (108);
then A=A(-1) (109) in zone Ia,
decreasing $S_c$ (126), and $R_c$ (128).
The next alternative, if $S_o < S_f$ (104),
and $(R_o + S_o) > [S_f - (R_o^2/2A)]$ (106) in zone III;
then $A = -R_o^2/[(S_f - S_o) \times 2]$ (121)
is selected to provide a smooth approach of $S_c$ to $S_f$ (126) and decreasing $R_c$ (128).
Another alternative, if the previous set point $S_o = S_f$ (104),
there is no set point change,
and $R_o$ (112) and A (122) are each set to 0 for zone IV,
then $S_c$ remains unchanged at $S_f$ (126)
and $R_c$ (128) is set equal zero.
Still another alternative is if $S_o > S_f$ (104),
and $(R_o + S_o) > [S_f + (R_o^2/2A)]$ (114),
and $R_o > (-R_m)$ (116) in zone V;
then A=-A (123)
causing both $S_c$ (126) and $R_c$ (128) to decrease.
The next alternative is if $S_o > S_f$ (104),
and $(R_o + S_o) > [S_f + (R_o^2/2A)]$ (114),
and $R_o \leq (-R_m)$ (116) in zone VI;
then $R_o = (-R_m)$ (118), A=0 (122)
and $S_c$ (126) changes at a rate of $-R_m$ and $R_c = R_o = (-R_m)$ as set above in (118).
The next alternative is if $S_o > S_f$ (104),
and $(R_o + S_o) > [S_f + (R_o^2/2A)]$ (114),
and $R_o < (-R_m)$ (116) in zone Va;
then A=A (117)
causing $S_c$ (126) and $R_c$ (128) to increase.
In the last alternative, if $S_o > S_f$ (104),
and $(R_o + S_o) \leq [S_f + (R_o^2/2A)]$ (114) in zone VII;
then $A = R_o^2/[(S_o - S_f)2]$ (124)
is selected to provide a smooth approach of $S_c$ to $S_f$ (126), and increasing $R_c$ (128).

With the values for A and $R_o$ so determined, the present set point is:

$$S_c = (AT^2/2) + R_o T + S_o \text{ (126)},$$

and the present rate is:

$$R_c = AT + R_o \text{ (128)}.$$

Referring now to FIG. 2c for the continuation of the flow chart of the controller of the present invention, the present error is calculated as:

$$E_c = S_c - V_c \text{ (132)}.$$

Next the present slope, or change, of error is calculated as:

$$dE_c = E_c - E_o = (S_c - S_o) - (V_c - V_o) \text{ (134)}.$$

Then for the system that is closely coupled the present output is calculated as:

$$O_{cc} = O_o + SC \cdot (E_c + dE_c) + [(dO_c + dO_o)/2] \text{ (136)}.$$

Expanding the above expression of the calculation of the present output:

$$O_{cc} = O_o + SC \cdot E_c + SC \cdot dE_c + [(dO_c + dO_o)/2]$$

The term $SC \cdot E_c$ represents the present error converted to units of output. The term of the equation $SC \cdot dE_c + [(dO_c + dO_o)/2]$ represents the present change in load, i.e., the change in error converted to units of output, $(SC \cdot dE_c)$, plus the change in output represents the change in load. The change in output for the cycle is the present error converted to units of output plus the change in load. When in RUN, as is the case here, the output of the controller of the present invention is the previous output plus the present error in units of output plus the present change in load.

For the system that is less than closely coupled (i.e., a buffered system) or a system of slow response to changes in the input, the present output is calculated as:

$$O_{cc} = O_o + (SC \cdot E_c \cdot T/SRT) + 2 \cdot SC \cdot dE_c$$

Equal portions (T/SRT) (i.e., the number of cycles occurring within the system response time) of the present error converted to units of output $(SC \cdot E_c)$ are added to the output each cycle. For example, if SRT is 8 seconds and the cycle time is 0.5 seconds, then 0.5/8, or 0.0625 parts of the present error, $E_c$, converted to units of output, are added each cycle.

When the cycle time, T, is less than the system response time, SRT, there is no direct feedback of the change in output for approximating the change in load in the following cycle. The number of cycles that occur before a given change in output is reflected as a change in variable is those that occur during the system response time. Even if this relationship of change in output and variable were monitored; it would, in all probability, be irrelevant due to other changes to the system that have occurred during the time. The change in output during times of changing load is a function of the present change in error, $dE_c$. $SC \cdot dE_c$, is an approximation of the change in load. Using $2 \cdot SC \cdot dE_c$ as an approximation of the present change in load improves the controller operation during times of a changing load or set point.

For a close coupled system: Each cycle, the controller of the present invention converts the current error, $E_c$, to units of output by multiplying $E_c$ by the system characteristic, SC, and adds this value, $SC \cdot E_c$, to the previous output. This value, $SC \cdot E_c$, is the amount that the controller output, or system input, needs to be changed to bring the variable from where it is to where it should be. When the system load is not changing, this is the only correction that needs to be made to the controller's output.

For the close coupled system: Each cycle, the controller of the present invention converts the current slope of the error or change of error, $dE_c$, to units of output by multiplying $dE_c$ by the system characteristic, SC; and adds this value, $SC \cdot dE_c$, to the previous output. This value, $SC \cdot dE_c$, is the amount that the controller output, or system input, needs to be changed to correct for the change in load. The controller of the present invention may add the previous change in output, $dO_o$, and $SC \cdot dE_c$ to the previous output. The previous change in output, $dO_o$, may be represented by $(dO_c + dO_o)/2$ for reasons discussed below.

It may be helpful to the understanding of how this adjustment for a change in load works to envision a system where the units of the system input or controller output, system output or load, and the system variable are all the same. A water tank where: the load or system output is measured in gallons per cycle (gpc); the make-up, system input, or the controller output is measured in gpc; and the amount of water in the tank, or the variable, is measured in gallons; provides a good model. Note, for this model, the system characteristic, SC=1.

Beginning with the just described system at steady state with a load of 10 gpc, an input or controller output of 10 gpc, a set point, S, of 10 gals, and a variable, V, of 10 gals of water in the tank; the error, E=S−V=0. Now, if the load is changed from 10 gpc to 8 gpc, in one cycle, the variable, V, becomes 12; the error, E, (−2); and the change in error, dE=(−2)−0=(−2). A basic formulation for the output of the controller of the present invention could be written as:

$$O_c = O_o + SC \cdot E + SC \cdot dE$$

In this basic form; $SC \cdot dE$, the change in error converted to units of output, represents the change in load.

From this, the output following the above cycle can be shown as:

$$O_c = O_o + SC \cdot E + SC \cdot dE$$
$$= 10 + (-2) + (-2)$$
$$= 6 \text{ gpc}$$

The controller output or system input is now 6 gpc.

The next cycle begins with a load of 8 gpc, an input or controller output of 6 gpc, and a set point, S, of 10 gals. At the end of the cycle: the variable, V, becomes 10; the error, E, 0; and the change in error, dE=0−(−2)=2.

Again, from:

$$O_c = O_o + SC \cdot E + SC \cdot dE$$
$$= 6 + 0 + 2$$
$$= 8 \text{ gpc}$$

The controller output or system input is now 8 gpc; the same as the load.

The next cycle begins with a load of 8 gpc, an input or controller output of 8 gpc, and a set point, S, of 10 gals. At the end of the cycle: the variable, V, is still 10; the error, E, 0; and the change in error, dE=0.

Again, from:

$$O_c = O_o + SC \cdot E + SC \cdot dE$$
$$= 8 + 0 + 0$$
$$= 8 \text{ gpc}$$

The controller output or system input is 8 gpc; the same as the load.

Now, assume the afore described system at steady state with a load of 10 gpc; an input or controller output of 10 gpc; a set point, S, of 10 gals; and a variable, V, of 10 gals of water in the tank. The error, E=S−V=0. Now, if the set point is changed from 10 gpc to 8 gpc, in one cycle, the error, E=(−2), and the change in error, dE=(−2)−0=(−2).

From:

$$O_c = O_o + SC \cdot E + SC \cdot dE$$
$$= 10 + (-2) + (-2)$$
$$= 6 \text{ gpc}$$

The controller output or system input is now 6 gpc. Notice how a change in set point is equivalent a change in load.

In an operating system; none of the above described events happen immediately nor are the actions taken by the controller precisely those needed. The dynamics of an operating system are such that the variables are constantly changing. There are also delays in sensing, and in actions taken. For operating systems, control is accomplished using approximations. For the closely coupled system and the less than closely coupled system, each cycle, the controller of the present invention makes very good approximations of the changes that need to be made to controller output to maintain the variable at set point during all phases of system operation.

For less than closely coupled systems, and, too, for the closely coupled system, the change in error converted to units of output provides a good approximation of previous change in load. Most usually, the load and system input are at a rate as shown in the afore described model. Likewise, a change to either occurs over some period of time. Adding the change in output to the change in error converted to units of output, or doubling the change in error converted to units of output, addresses this change in load over time and allows the controller of the invention to control the variable very close to set point during those times when either or both the load and set point are changing. Taking the average of the current change in output, $dO_c$ and the previous change in output, $dO_o$, (136) acts to filter out system noise and to provide a broader reference for load changes.

The change of the controller output, do, for the present cycle of time, T, is then calculated as:

$$dO = O_{cc} - O_o \text{ (138)}.$$

At blocks 140 through 146, output limiting is provided for those times when the controller is to be operated without set point generation, and, in general, as good practice. With the change of output limited to some maximum, $dO_m$, as shown, the controller of the present invention can, without set point generation, start up and come to set point with minimal overshoot. The limit for change in output derives from the capacity of the source system input, such as the steam boiler, electric power supply, etc. The limit per cycle is this system limit converted to cycle time. For example, if the capacity of the input source is 10 units of input per minute and the controller cycle time is 0.5 seconds per cycle, then:

$$dO_m = (0.5 \text{ sec./cycle}) \times (10 \text{ units/min.}) \times (1 \text{ min./60 sec.})$$

$$dO_m = 0.833 \text{ units/cycle}$$

Thus the next step is to determine the range that do is in:

if $dO > dO_m$ (140), then it is set as $dO = dO_m$ (142);

if $dO < (-dO_m)$ (140), then it is set as $do = (-dO_m)$ (144); and if $dO_m > dO > (-dO_m)$ (140), then dO remains unchanged. Next, the present output is calculated as:

$$O_c = O_o + dO \text{ (146)}$$

Next the present value of SC is calculated:

$$\text{If } (dO_c + dO_o) = 0 \text{ or } (V_c - V_o) = 0 \text{ (147)}$$

SC remains unchanged, otherwise:

$$SC = [(dO_c + dO_o)/2]/(V_c - V_o) \text{ (148)}$$

For the system that is less than closely coupled (i.e., a buffered system or a system of slow response to changes in input); changes in the variable are not proximally synchronous with changes in the system input. For the operating close coupled and, too, the less than close coupled systems, the proper current value for the system characteristic, SC, can be determined as follows: Referring to FIG. 2e, which represents a substitution for blocks 147 through 148 for the close coupled controller:

if $E_c > 0$ and $dO > 0$ or $E_c < 0$ and $dO < 0$ (147a)

then SC=1.005·SC (148a)

otherwise SC=0.995·SC (148b)

At block 147a, during each cycle the controller of the present invention checks whether the current error $E_c$ is greater than or less than zero. If the value of $E_c$ is greater than zero and the change in output, dO, is greater than zero, or if $E_c$ is less than zero and the change in output, dO, is less than zero (i.e., there is an increasing error of control because SC is low); then, SC is increased (block 148a) by multiplying the current value for SC by a number slightly greater than 1.0. If neither of the two conditions mentioned above exists the value of SC being used is not low, and SC is decreased (block 148b) by multiplying the current value of SC by a number slightly less than 1.0. Then, flow returns to block 149 in FIG. 2c from either block 148a or 148b.

At this point all previous values for the variables are updated to equal their respective present values (149). For dO, two shifts occur; first the previous is updated with the value of the present value, then the present value is updated with the just calculated dO.

The timer, $T_{mr}$, completes timing down to zero, ending the scan (150).

Then the cycle is repeated, beginning the next cycle of operation at RUN (94) of FIG. 2a.

Uniquely, the controller of the present invention repeats a cycle of sequentially updating set point, measuring error, determining the change of error, determining the change of load, calculating a value for output, determining the change in output, changing output, and updating all variables. Each cycle, the controller uniquely converts the error of control into units of output, combines the converted change in error with change in output to determine the change of system load, combines the measure of change in load with the converted present error and previous output to determine present output, then updates all the cycle variables for the next cycle. Additionally, the controller of the present invention, with unique self tuning capabilities, can determine appropriate values for system response time and for error to output conversion. Further, the controller of the present invention has a unique set point generation capability. This set point generation ability provides for smooth, controlled changes in set point per a set of variable parameters. The rate of change of set point, $R_c$, may increase or decrease from zero at the start of the change, and likewise decrease or increase to zero at the end of the change depending on whether $S_c$ is increasing or decreasing (see the discussion of FIG. 2d below).

Due to these unique features, the controller of the present invention closely controls the controlled variable of the system to which it is applied very close to, or at, set point during all phases of normal operation including startup, set point change, and load change. Further, the controller of the present invention quickly and automatically returns the system under control to normal operating conditions after power failure or other system upsets, and does not become lost or behave in a chaotic manner when an out of the ordinary set of operating conditions arises. Thus the controller of the present invention is suitable for any application involving control of a variable to set point.

Moving next to FIG. 2d, there are shown three functions of the controller of the present invention along a common time scale to illustrate each of the signal's values with respect to the others at various times. At the top of FIG. 2d there is shown a plot of the present set point, $S_c$ (152) generated by the controller of the present invention over time with an acceleration, A, of 0.2, a maximum rate, $R_m$, of 4.0, and a cycle time, T, of 1.0 second. Below the present set point curve 152 there are plots of the present rate, $R_c$ (154) and the acceleration, A (156) over the same period of time. The zones I through VII discussed above with respect to the flow chart of the controller of the present invention are denoted here with roman numerals I through VII in association with the time coordinate to which it corresponds (zones Ia and Va are not shown on FIG. 2*d*).

For zones I, II, and III the final set point, $S_f$, value, 100, is greater than the previous set point $S_o$ (see block 104 of FIG. 2*b*). In zone I, the present rate, $R_c$, having an initial value of 0 increases at rate of A, 0.2 times T having a value of 1 to $R_m$, while the present set point, $S_c$, increases at a smooth rate to 40.

In zone II, the previous rate, $R_o$, is not less than $R_m$ (see block 108 in FIG. 2*b*) so $R_o$ is set equal $R_m$ (block 110) and A is set to zero (block 122). The present set point, $S_c$, then increases linearly at a rate $R_m$=4 to a value of 60.

In zone III ($R_o+S_o$) is greater than $(S_f-R_o^2)/2A$ with $S_o$ increasing from a value of 60 to become equal or greater than $S_f$ (see blocks 104 and 106 of FIG. 2*b*), and the present rate, $R_c$, initially at 4 decreases at a rate of approximately –A (–0.2 as shown here) times T to zero. Thus the present set point, $S_c$, increases at a slower, smooth rate to 100.

For zone IV, the previous set point, $S_o$, and the final set point, $S_f$, shown here as 100, are equal (see block 104 in FIG. 2*b*), and the previous rate $R_o$ and A are both set to 0.

For zones V, VI, and VII, the final set point, $S_f$, is less than the previous set point $S_o$ (see block 104 of FIG. 2*b*).

In zone V, the present rate, $R_c$, is initially 0 and decreases at rate of –A (–0.2 as shown here) to $-R_m$ with a value of –4 as shown here. The present set point, $S_c$, in this zone decreases at a smooth rate from 100 to 60.

In zone VI, the previous rate, $R_o$, is not greater than $-R_m$, so $R_o$ is set equal $-R_m$ as is A, with the present set point, $S_c$ decreasing linearly at a rate, $-R_m$, shown here as –4, from 60 to 40.

Zone VII begins when $R_o+S_o$ becomes equal to, or less than, $(S_f+R_o^2)/2$, i.e., $S_o$ is 40, as shown here with the present rate, $R_c$, initially at –4 increasing at rate of approximately A (shown here as 0.2) to zero and the present set point, $S_c$, decreases smoothly at a slower rate to 0.

With reference to FIGS. 6*aa* through 6*f*, there are shown specific examples of the operational response of the controller of the present invention and McCutcheon in various applications.

FIGS. 6*aa*–6*ab* show the data from a simulated run from startup to final set point for the controller of the present invention applied to a system with no external loading. The initial variable, $V_o$, and the initial set point, $S_o$, are at –50, the acceleration, A, is 0.4, the maximum rate, $R_m$, is 6.0, and the desired final set point, $S_f$, is 150 (220). Note that the present rate, $R_c$ (226), changes at 0.40/T up to a maximum of 6.0, and the present set point, $S_c$ (222), changes proportionally to A and $R_c$. Observe that the present set point, $S_c$ (222), is smoothly brought up at an increasing rate to the maximum rate, $R_m$, from the initial set point, $S_o$ of –50. Observe, too, the reduction in the present rate, $R_c$, from 6 to 0 as the present set point, $S_c$, reaches 150. Note the ability of the controller of the present invention to control the present error, $E_c$, (228), within ±1.0 throughout the run, and, in particular, the control of $E_c$ to within ±0.4 during the times set point, $S_c$, is changing at $R_c$=6.0/T. Note, too, how the controller brings the present process variable, $V_c$ (224), to a final set point without significant overshoot or error.

FIGS. 6*ba*–6*bb* show the data from a simulated run from startup to final set point for the controller of the present invention applied to a system with no external loading with the initial variable, $V_o$, and the initial set point, $S_o$, at 150, the acceleration, A, at 0.40, the maximum rate, $R_m$, at 6.0, and the desired final set point, $S_f$, at –50 (230). Note that the present rate, $R_c$ (236), changes at –0.40/T up to a maximum of –6.0, and the present set point, $S_c$ (232), changes proportionally to A and $R_c$. Observe that $S_c$ (232) is smoothly brought down at a decreasing rate to a maximum rate $-R_m$ from the initial set point, $S_o$, of 150. Observe, too, the increase in present rate, $R_c$, from –6 to 0 as the present set point, $S_c$, reaches –50. Again, note the ability of the controller of the present invention to control the present error $E_c$ (238) to within ±1.0 throughout the run, and, in particular, the control of $E_c$ to within ±0.4 during the times set point, $S_c$, is changing at $R_c$=–6.0/T. Note, too, that the controller brings the process variable to final set point without significant overshoot or error.

Now, in FIGS. 6*ca*–6*cb*, the operation of the prior art McCutcheon controller is shown with the data from a simulated run from startup to final set point for a system with no external loading. For comparison, these are the same conditions simulated for the controller of the present invention in FIG. 6*a*. The initial variable, $V_o$, and the initial set point, $S_o$, are at –50, the acceleration, A, is 0.40, the maximum rate, $R_m$, is 6.0, and the desired final set point, $S_f$, is 150 (240). Note the inability of the McCutcheon controller to control the present error, $E_c$ (242), within ±6.0 throughout the run, and, in particular, during the times set point, $S_c$, is changing at $R_c$=6.0/T. The McCutcheon controller does not deal at all well with continuing change of set point or load, which are the same.

With reference to FIG. 6*d*, there is shown data from simulated runs for both controllers, present invention and prior art, applied to a system where the present variable, $V_c$, has been disturbed or disrupted by –10 to 140 from the present set point, $S_c$, of 150 (250 and 251). Note the ability of the controller of the present invention to reduce the present error to ±1.0 within five cycles and to reduce the present error to ±0.2 within eleven cycles (256). Note the inability of the McCutcheon controller to quickly reduce the error and to return the process variable to set point during the run (257).

With reference to FIG. 6*e*, there is shown data from simulated runs for both the controller of the present invention and the prior art McCutcheon controller applied to a system where the load (262) and 263) is increasing over the nine cycles (260 and 261). Note the ability of the controller of the present invention to quickly adapt to the increasing load and to bring the process variable near to set point during the increase (264). Note too, the ability of the controller of the present invention to recover after cessation of load change (264). Conversely, the controller of the prior art is unable to control the variable near set point during the load increase (265) and has difficulty returning the variable to set point after the cessation of load increases (265).

With reference to FIG. 6*f*, there is shown data from simulated runs for both the controller of the present invention and the prior art McCutcheon controller applied to a system where the load is decreasing over nine cycles (270 and 271). Note both controllers respond to the decrease as they did the increase shown in FIG. 6*e*.

Beyond this inability to handle continuing load change, the McCutcheon controller takes nearly twice as long as the controller of the present invention to recover from a disturbance or load change. In summary, the McCutcheon controller does quite well if there is no continuous load change, and the process variable is at or near set point. Note, too, that under the described conditions, the change in error is closely related to the change in load.

Figure 7:
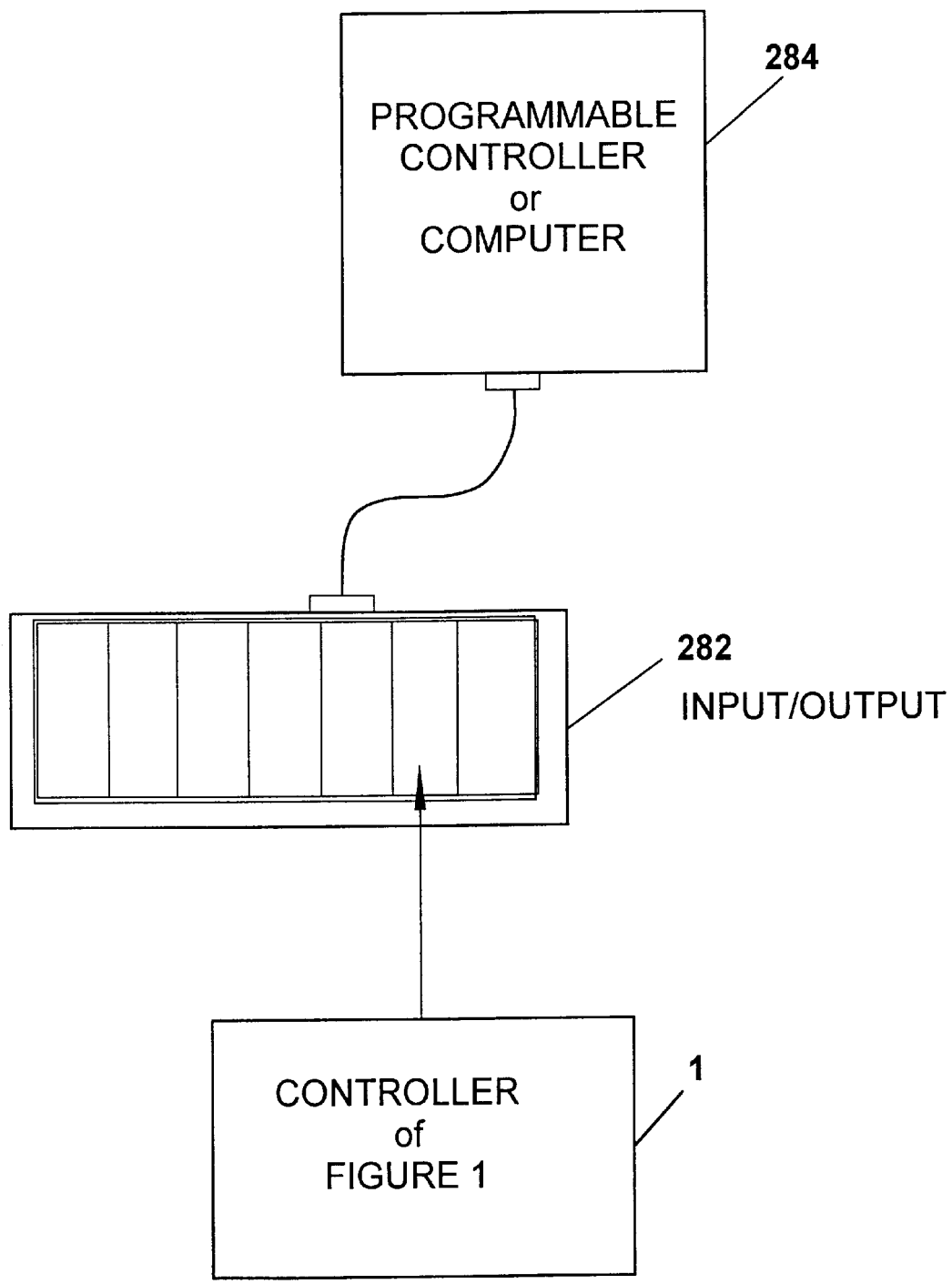
FIG. 7 depicts the controller of the present invention as Input/Output to programmable controller or computer.

In FIGS. 7 through 11, several specific examples for the application of the controller of the present invention are discussed. Referring to FIG. 7 controller 1 of the present invention is shown as part of an Input/Output (I/O) system 282 for a programmable logic controller, computer, or other intelligent device 284. Through this I/O connection the controller acts as an intelligent I/O device accepting parameters for control as input from, and transmitting information to, the intelligent device via the communications interface 70 for overall system control and monitoring. Those calculations required of controller 1 for control of the variable are carried out by onboard microprocessor 50, thus saving the parent device 284 processing time. Thus configured, the conditioning of the input variable signal 72 and the output to the system input 74 could be done at and by controller 1 of the present invention.

Figure 8:
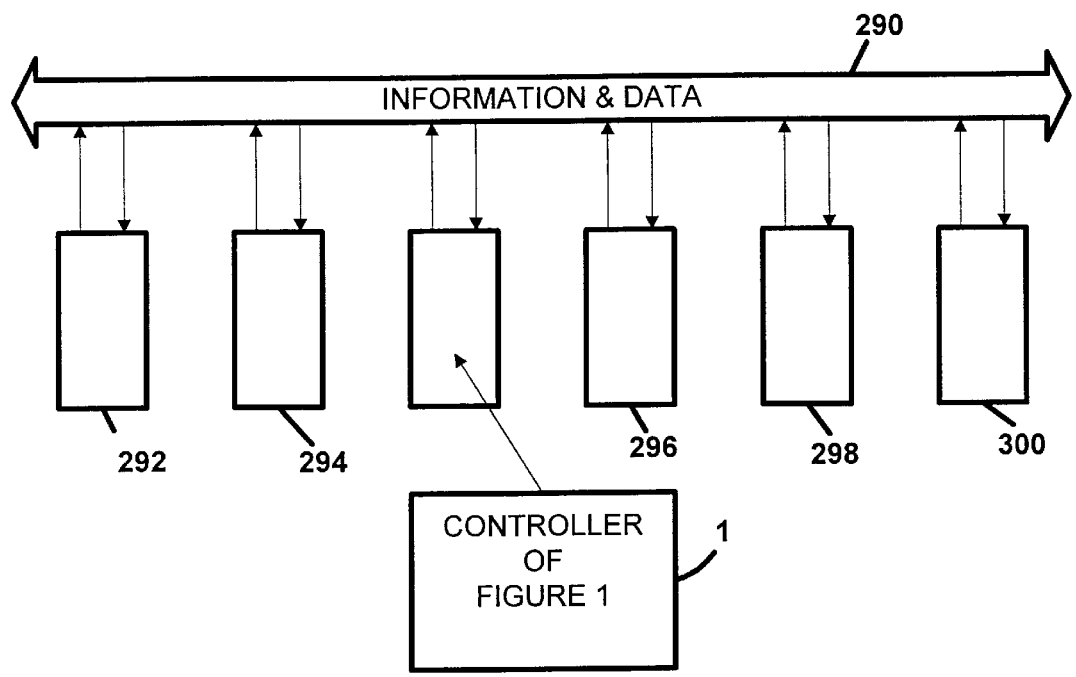
FIG. 8 depicts the controller of the present invention as part of a network of intelligent devices.

Then in FIG. 8, controller 1 of the present invention is shown as part of a network of intelligent devices 292, 294, 296, 298 and 300, connected by a communication and data bus 290, acting together to control a system. These other intelligent devices might be other controllers, data acquisition and monitoring devices, programmable controllers, computers, etc. Thus configured, controller 1 acts as a stand alone controller for that device or part of the overall system which it controls. It may also provide parameters to other intelligent devices via common data bus 290 and accept same therefrom via communications interface 70 to form a network for controlling an overall, more complex, integrated system.

Figure 9:
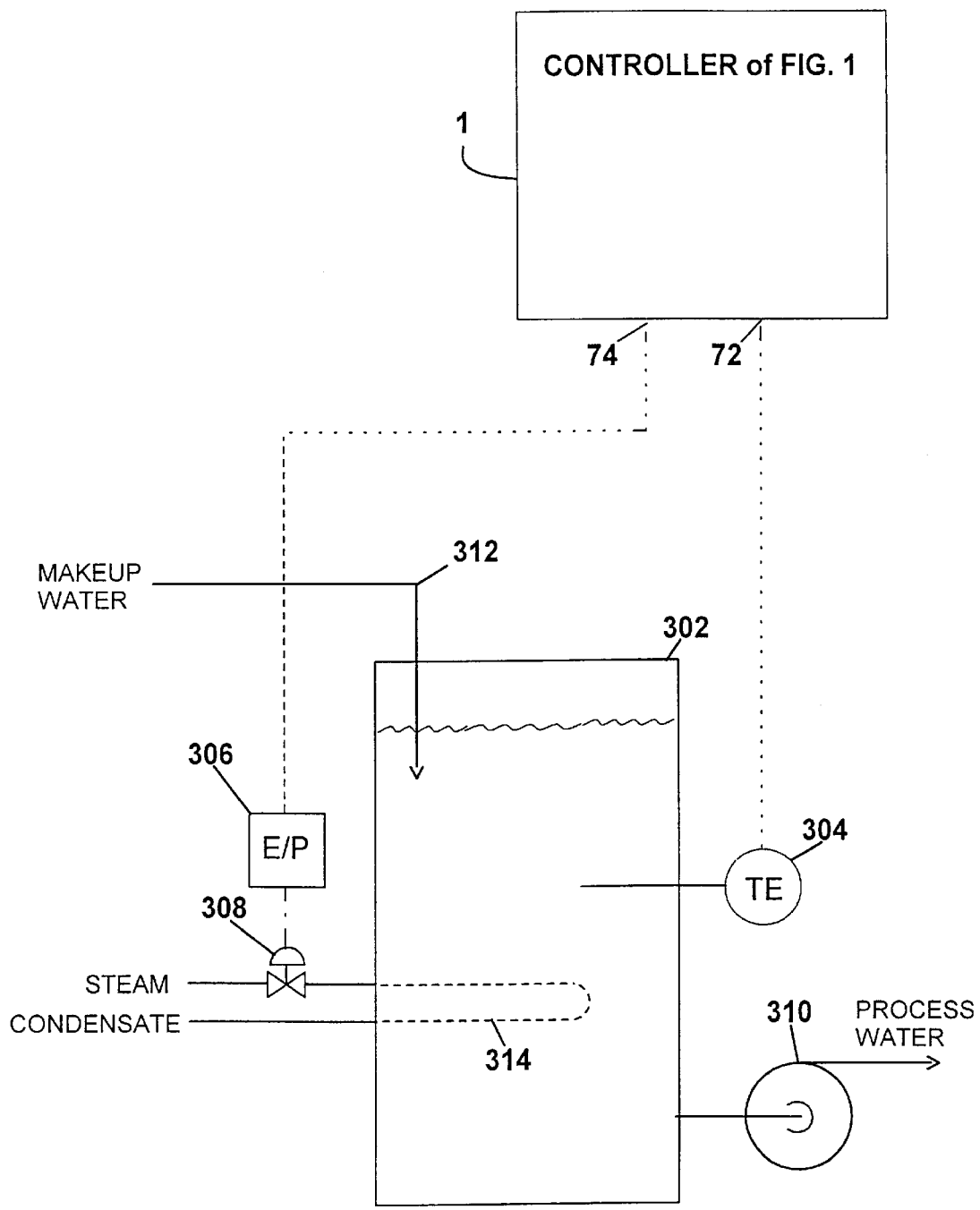
FIG. 9 depicts the controller of the present invention as a stand alone controller in a process control application.
Figure 10:
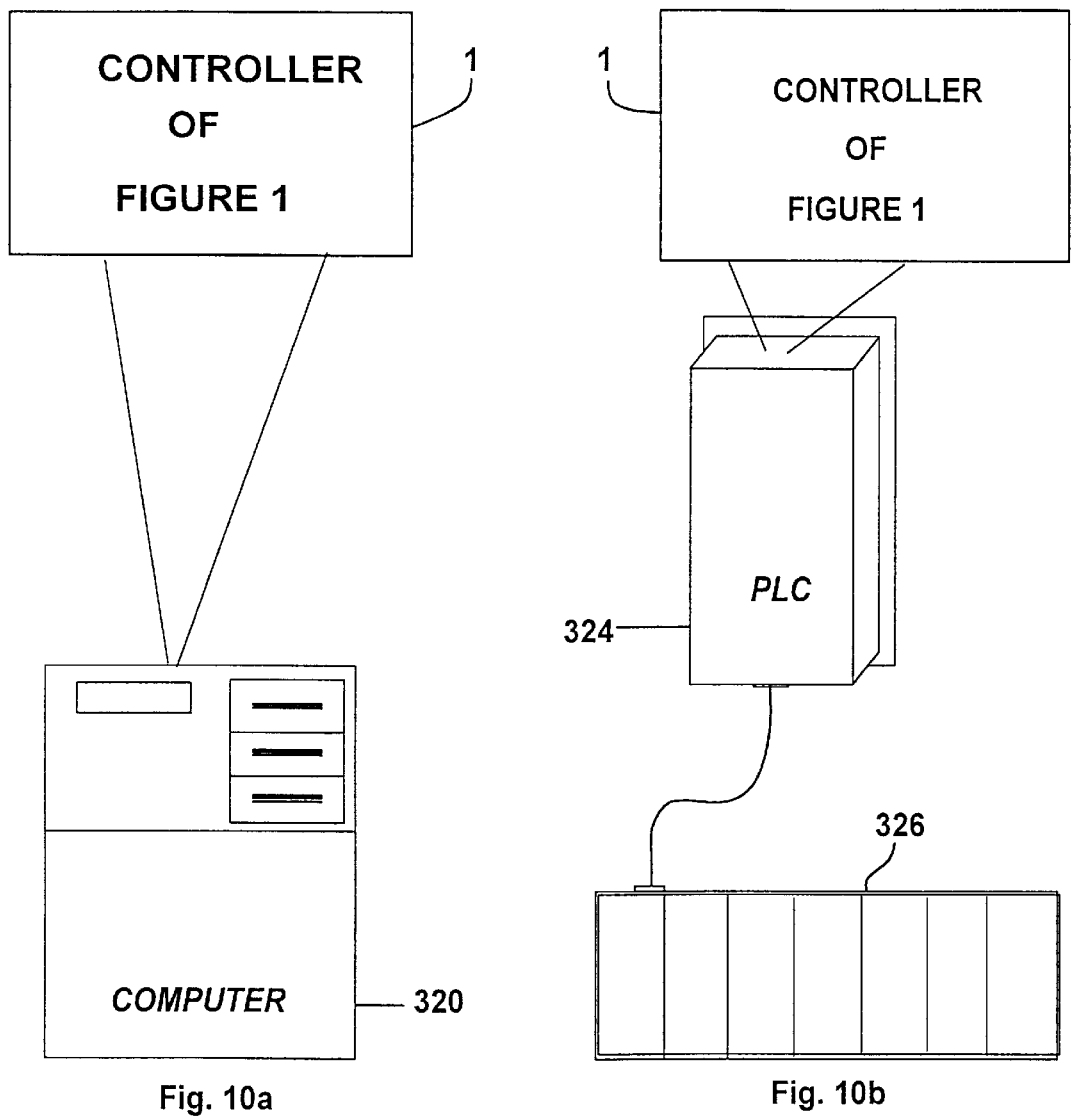
FIGS. 10a and 10b depict the controller of the present invention resident in a computer, programmable controller, or other programmable intelligent device.

In FIG. 9 controller 1 of the present invention is shown as a stand alone controller for controlling the temperature of a process hot water tank 302. The analog input 72 is from a temperature sensor 304 which measures water temperature and transmits a corresponding electrical signal, e.g., 4–20 ma. The controller analog output 74 is shown going to an electrical to pneumatic (E/P) transducer 306 which sends a proportional air pressure signal to the positioning valve 308 which controls the rate of steam flow to the tank heating coil 304. During normal operation, process water 310 is removed as required for process and makeup water 312 is added as required to maintain the water level. At startup, tank 302 is smoothly brought up to set point without overshoot of temperature, or settling out time. During operation, temperature is held at or very near set point during load changes.

In FIG. 10a controller 1 of the present invention is shown resident the software of a computer 320, or other intelligent device. All the functions of controller 1 are performed exactly as if the controller existed as hardware therein. The value of the controlled variable is brought in through the computer's input devices, and the output to the controlled systems input is via the intelligent device's output devices. Parameter input to controller 1 in this configuration is either via the intelligent devices keyboard or operator interface, or other input devises. Display of parameters is possible at a terminal and/or other output devices.

With reference to FIG. 10b, controller 1 of the present invention is shown resident the software of a programmable controller 324, or other intelligent device. All the functions of controller 1 are performed exactly as if the controller existed in hardware therein. The value of the controlled variable is brought in through the unit's Input/Output (I/O) 326, likewise the signal to the controlled system input is via the intelligent device's I/O 326. Parameter input to controller 1 is either via the intelligent device's keyboard or operator interface, or other input devices. Display of parameters is possible at a terminal and/or other output device.

Figure 11:
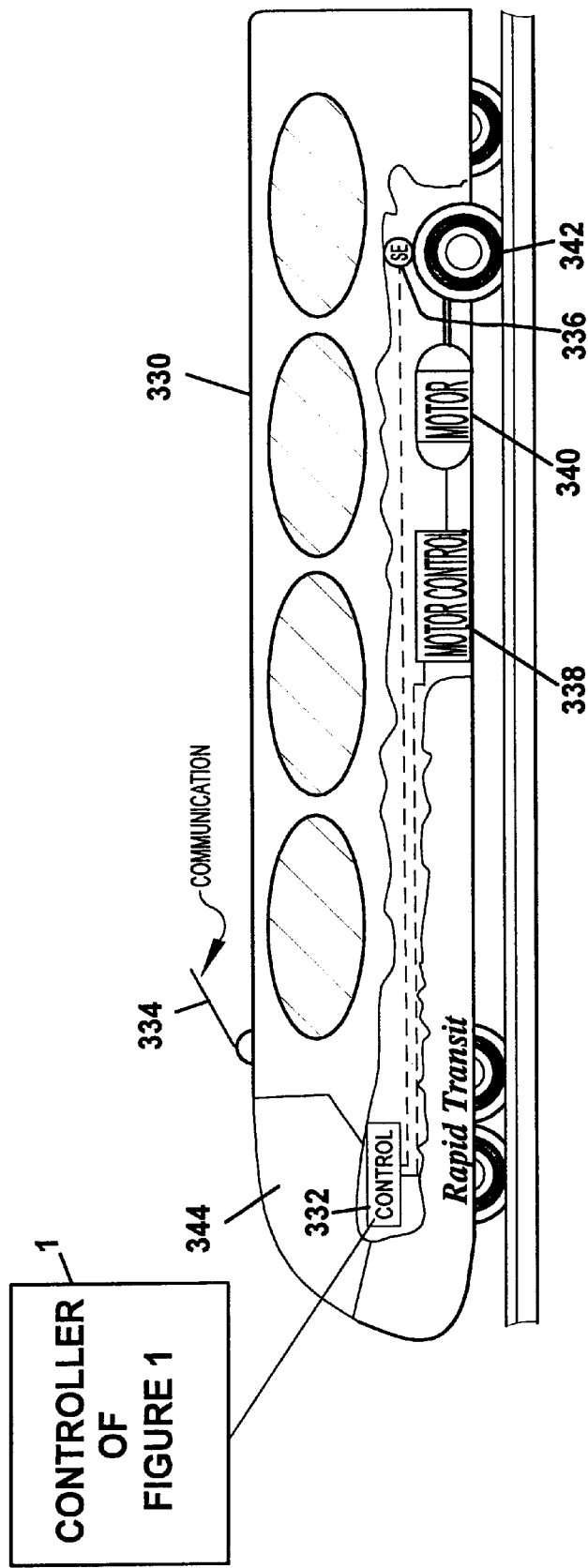
FIG. 11 depicts the controller of the present invention providing vehicular speed control in a rapid transit system application.

Then in FIG. 11, controller 1 of the present invention is shown 332 for controlling the speed of a rapid transit train 330. Accepting input of parameters from a central computer, or an operator, via the transit system communication system 334 and communications interface 70 there within, controller 1 smoothly accelerates the train up to a desired speed, maintains that speed until asked to change, then smoothly accelerates or decelerates as required to some new speed. At all times, the speed of vehicle 326 is brought in via analog input 72 and becomes the present variable, the input to motor control 338 leaves controller 1 as analog output 74, so as to control the speed of drive motor 340, the speed of drive wheel 342, and thus the speed of train 336 to the present set point. Such control parameters as the present set point, the final set point, the maximum rate of change, the acceleration, etc., would be made available to operator 344 as deemed necessary. Using controller 1 for individual train speed control and the rate of change thereof, the transit system's central computer control system could control all its trains positions relative to one another, and the scheduling of all trains within the system, with controller 1 freeing the transit system's central control computer of the many calculations required for individual train speed control. A central control computer could control the entire system by communicating with individual controllers 1.

Figure 12:
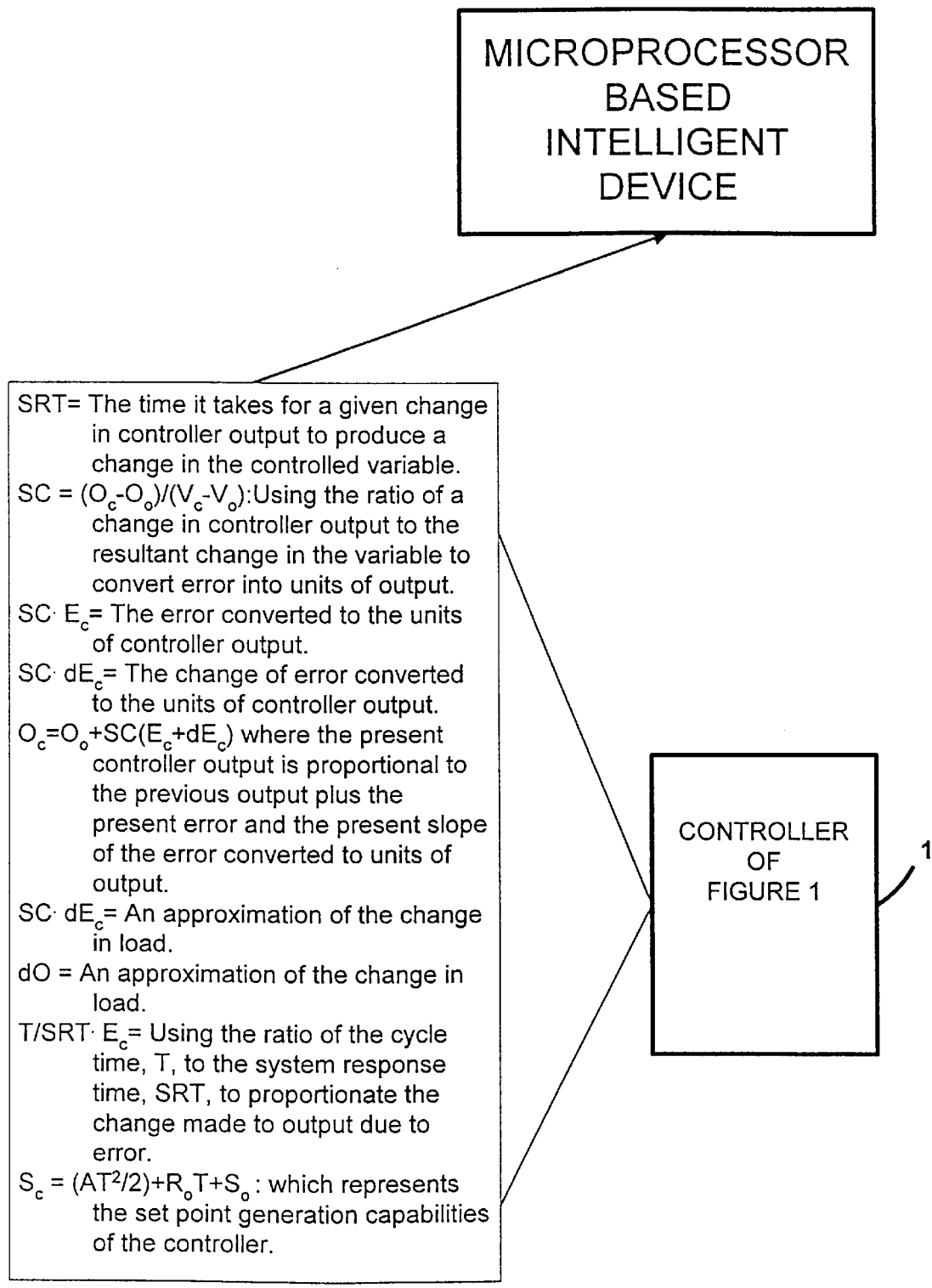
FIG. 12 depicts one or more of the unique features of the controller of the present invention incorporated into another microprocessor based intelligent device.

In FIG. 12 a microprocessor based intelligent device other than the controller of the present invention is shown incorporating one or more of the unique features of controller 1 of the present invention. Examples of the feature(s) appropriated by the other device and the uses made thereof include: determining of the system response time as the time between a change of the system input and a resultant change of the controlled system variable, and the utilization of same for matching the operation of the device to a system; determining the ratio of a change in system input to a resultant change in the system variable, a system characteristic, and the utilization of same in the control of the system input; sequentially making the present output of the device proportional to the previous output plus the error and slope of the error converted to units of output; using the change in error or the change in output to approximate the change in load, and the utilization of the same change in load to adjust the system input; using a ratio equivalent that of the cycle time to the system response time to proportionate changes made to the system input; and using the unique method of set point generation, of the present invention. The microprocessor based intelligent device other than the controller of the present invention might incorporate or utilize any one, some, or all of the unique features of the controller of the present invention.

Figure 5A:
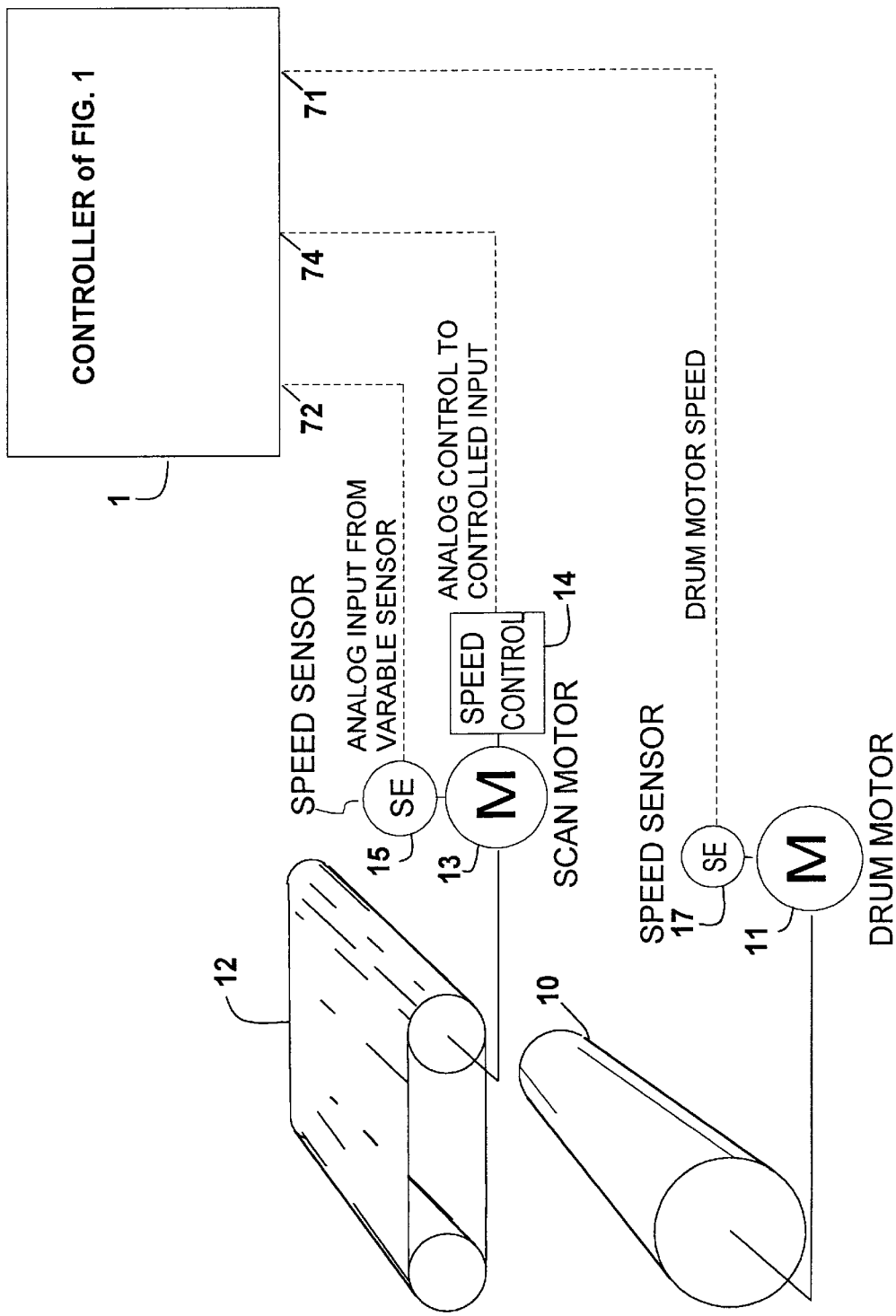
FIG. 5a depicts the controller of the present invention applied to the application of the prior art of McCutcheon.
Figure 5B:
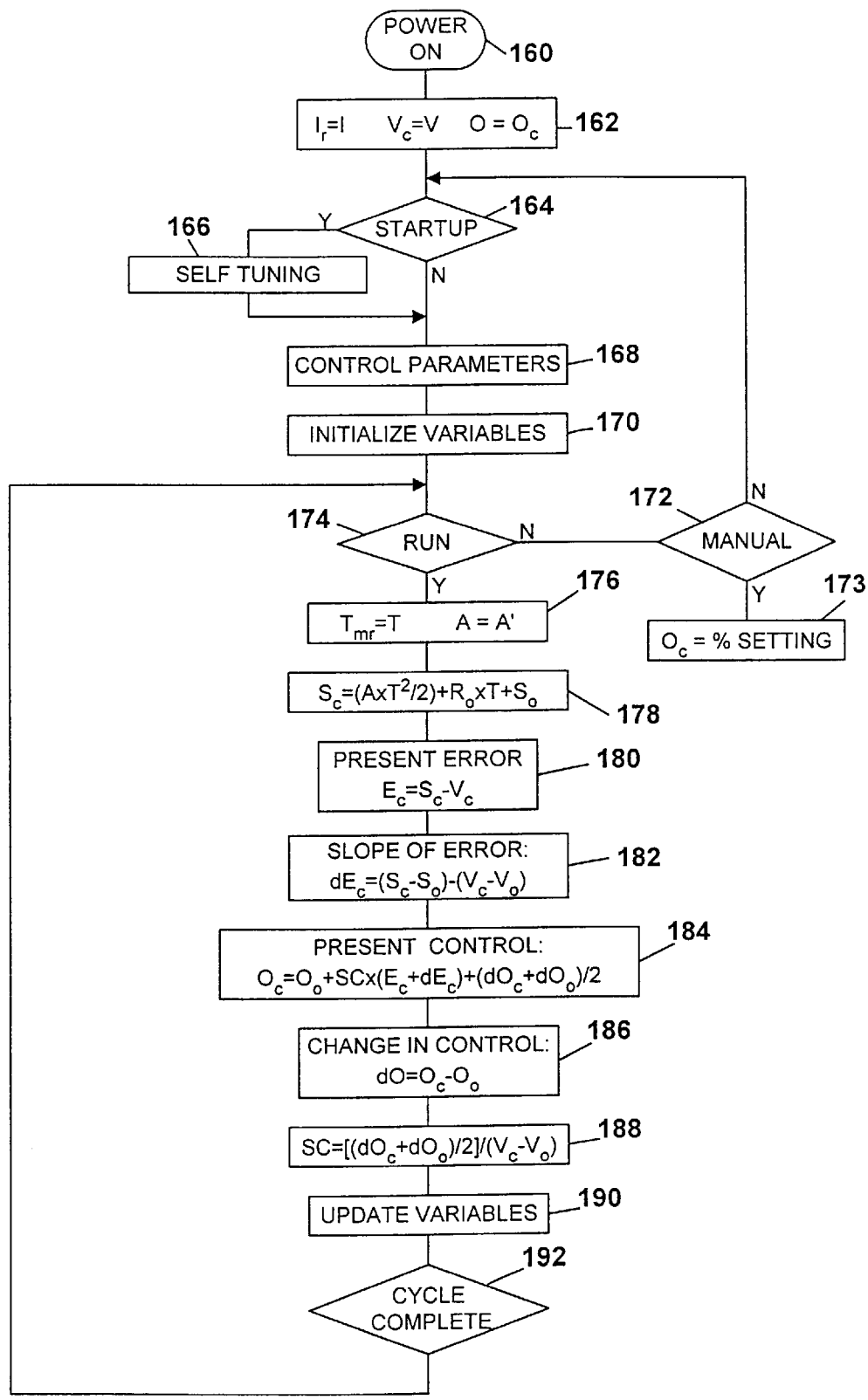
FIG. 5b is a simplified flow chart of the controller of the present invention applied to the application of the prior art of McCutcheon.

In comparison, the capabilities of controller 1 of the present invention exceed those of the McCutcheon controller as will be seen from the following discussion and reference to FIGS. 5a and 5b. In FIG. 5a, controller 1 of the present invention is shown applied to the application of the McCutcheon system in U.S. Pat. No. 4,218,735. On the right side of the figure there is shown the block diagram of controller 1 of the present invention as shown in FIG. 1, and on the left side is the motor system of the McCutcheon patent. To connect controller 1 of the present invention to the motor system of the McCutcheon patent, an analog input 71 from speed sensor 17 for drum motor 11 is inputted to controller 1 of the present invention via A/D converter 61, I/O registers 60 and data bus 59 for storage in RAM 54 as the present reference input, $I_r$; an analog input 72 from speed sensor 15 for scan motor 13 is inputted to the controller via A/D converter 62, I/O registers 60 and data bus 59 for storage in RAM 54 as the present variable, $V_c$; and the analog output 74 of controller 1 is connected to speed control 14 of scan motor 13 representing the present output, $O_c$, from RAM 54 outputted via data bus 59, I/O registers 60 and D/A converter 64.

With reference to FIG. 5b, the functions of controller 1 of the present invention, applied to the application of the McCutcheon patent, are shown in a simplified flow chart format.

Now with reference to both FIGS. 5b and 5a, if power is on (160), initially the present output, $O_c$, is set to zero, then the controller of the present invention continuously stores the analog input 71 from speed sensor 17 for drum motor 11 as the present reference input, $I_r$, the analog input 72 from speed sensor 15 for scan motor 13 as the present variable, $V_c$, and continuously outputs the present output, $O_c$, 74 to scan motor speed control 14.

The startup cycle is run when first placing the controller in operation. To run the startup cycle, the system is first brought to a steady state, no load condition in MANUAL. For the application of the McCutcheon patent, the scan motor would be brought to a speed within the normal operating range. The time required to run the startup cycle, for this application, is approximately twice the system response time, or, probably less than 50 msec.

In STARTUP (164), the controller of the present invention determines values for the tuning parameters, system response time, SRT, and the initial system characteristic, SC, that are appropriate for the particular application in a self tuning operation (166). With the system in steady state and unloaded, the controller sets the value of the previous output, $O_o$, equal the present output, $O_c$, initiates a given low level ($\geq 5.0\%$) increase in analog output signal 74 to the system input (speed control 14) and measures the time until the present process variable, $V_c$, begins to change, i.e., the time required to detect a change in the process variable due to a change in controller output. The controller determines the time to detect a change, records this time (the system response time, SRT), stores the value of the variable $V_c$ as $V_o$, waits for the same period of time required to detect a change, notes the value of the variable $V_c$ again, then calculates the ratio of change in output to the change in the variable ($V_c-V_o$). Or, the system characteristic, $$SC=(O_c-O_o)/(V_c-V_o).$$

The cycle time, T, (the preset value for the controller's timer, $T_{mr}$) is set equal twice the time required to detect a change in the process variable. The values for T, SRT, and SC are stored in RAM 54 for use in the run cycle (174). The limit for change in output, $dO_m$, should be no more than necessary for the desired maximum rate of change for the system, should allow for any anticipated response requirements, should preclude overloading the source of system input, is entered manually, and is also stored in RAM 54.

Unless changes are made to the system, the controller of the present invention requires no further tuning beyond the ascertainment of these parameters. After this initial startup sequence, the STARTUP cycle is omitted in subsequent operation.

The control parameters, entered via keyboard and display 68, or communications interface 70, are stored in RAM 54 for use in succeeding calculations (168). These parameters may be changed at any time. The desired final set point, $S_f$, represents the desired final set point for a given set of input parameters. For the application of the prior art, $S_f=I_rQ_d$, where $I_r$ is the present reference and $Q_d$ is the desired ratio of the present variable, $V_c$, to the present reference $I_r$; the maximum rate, $R_m$, is the maximum of rate of change for the present set point, $S_c$; acceleration, A', is the base rate of change of the present rate, $R_c$; error values for alarm are $E_m$ and $E_a$; and cycle time, T, is the preset value for the scan timer, $T_{mr}$, and thus the length of each scan. The system response time, SRT, is provided by the startup cycle, likewise, the system characteristic, SC. The output limit, $dO_m$, is entered manually.

Before the controller of the present invention begins operation in RUN; the variables of control need to be initialized (170). the initial process variable, $V_o$, is set equal $V_c$; the initial set point, $S_o$, is set equal $V_c$; the initial output, On, is set equal $O_o$; the initial change of set point rate, $R_o$, is set equal zero; the present error, $E_c$, is initialized to equal zero; and the present change in output, $dO_c$, and the previous change in output, $dO_o$, are initialized to equal zero.

If the controller is not in RUN (174), the controller is in MANUAL (172). When in MANUAL, the present output, $O_c$, is entered as provided via keyboard and display 68, or communications interface 70.

If the controller of the present invention is in RUN (174), it begins a cycle by presetting the scan timer, $T_{mr}$, to the cycle time, T, and storing the base acceleration, A', as the present acceleration, A (176).

Next the controller provides for the local generation of set point per a set of parameters provided via keyboard and display 68, or communications interface 70. These parameters can be changed at any time. For the application of McCutcheon the desired final set point is: $S_f=I_rQ_d$, with the controller providing smooth, controlled changes in set point with the rate of change of set point increasing from zero at the start of the change and decreasing to zero at the end of the change for an increasing set point and vice versa for a decreasing set point. The present set point is:

$$S_c=(AT^2/2)+R_oT+S_o \quad (178)$$

and in each cycle the controller asks whether the present set point, $S_c$, should be greater than or less than the previous set point, $S_o$, i.e., is the previous set point, $S_o$, greater or less than the final set point, $S_f$. Also in each cycle, the controller determines if it should increase, decrease, limit, or keep the same the rate of change in set point, $R_o$. In this configuration, the acceleration, A, can be either positive, negative, or zero as required to change the rate, $R_o$, so as to smoothly change the present set point, $S_c$, to equal $S_f$. The requirement of smooth change for the present set point to the final set point, $S_f$, is most obvious for vehicular control applications, however it applies to all.

The present error is calculated as $E_c=S_c-V_c$ (180), where; if $E_c$ is negative, the process variable is above set point, and, if $E_c$ is positive, the process variable is below set point.

The present change of the error, $dE_c$, for time T is calculated as $dE_c=(S_c-S_o)-(V_c-V_o)$ (182), where; if $dE_c$ is negative, the variable and the set point are converging; if $dE_c$ is positive, the variable and the set point are diverging; and, if $dE_c$ is zero, the variable and the set point have the same slope.

The present output is calculated next as:

$$O_c=O_o+SC(E_c+dE_c)+[(dO_c+dO_o)/2] \quad (184)$$

and the determination of output for the controller of the invention is more understandable if rewritten as:

$$O_c=O_o+SC \cdot E_c+SC \cdot dE_c+[(dO_c+dO_o)/2]$$

The term of the equation, $SC \cdot E_c$, represents the present error converted to units of output. Present error is previous error plus the present change in error, or $E_c=E_o+dE_c$; and the term of the equation, SC·dE$_c$+[(dO$_c$+dO$_o$)/2], represents the present change in load, i.e., the change in error converted to output plus the change in output represents the change in load. The change in output for the cycle is the present error converted to units of output plus the change in load. When in RUN, the present output of the controller is equal to the previous output plus present error in units of output plus the present change in load.

The change of the controller output, dO, for the present cycle of time T is calculated as:

dO=O$_c$−O$_o$ (186).

Next the present value for SC is calculated as follows:

SC=[(dO$_c$+dO$_o$)/2]/(V$_c$−V$_o$) (188)

Then all previous values for the variable are updated to equal their respective present values (190); the timer, T$_{mr}$, completes timing down to zero, ending the scan (192); and the cycle is repeated, beginning the next cycle of operation at RUN (174).

After the initial Startup cycle has been completed, the controller of the present invention automatically brings the speed of scan motor to the desired ratio of the drum motor speed each time the system is started and closely controls the scan motor to desired speed during the subsequent operation of the system. Also, the controller of the present invention, with unique self tuning capabilities, determines appropriate values for system response time and error to output conversion; is matched to the response time of the system of application; has unique set point generation capability providing for smooth, controlled changes in set point per a set of variable parameters with the rate of change of set point increasing from zero at the start of the change and decreasing to zero at the end of the change; and repeats a cycle of sequentially updating set point, measuring present error, determining present change of the error, calculating a present value for output, determining the change in output, determining SC, and updating all variables. Additionally, each cycle the controller of the present invention uniquely converts the error of control into units of output, combines the converted change in error with change in output to determine present change in system load, combines the change in load, the converted present error, and previous output to determine present output, then updates all the cycle variables for the next cycle. Due to these unique capabilities, the controller of the present invention closely controls the controlled variable of the system to set point during all phases of normal operation including startup, set point change, and load change. Thus the controller of the present invention quickly and automatically returns the system under control to normal operating conditions after power failure or other system upsets, and does not become lost or behave in a chaotic manner when an out of the ordinary set of operating conditions arise. Therefore the controller of the present invention is suitable for any application involving control of a variable to set point.

The controller of the present invention makes sequential corrections to the level of input to the system of the variable based on: system response time, relationship of controller output to the variable characteristic of the system, deviation of the variable from set point, and change in system load as determined by combining change in error with change in system input. Correction to system input equivalent the error or deviation is made each cycle by first converting the error to units of controller output and adding same to the previous controller output. For those times when system load is unchanging, this correction alone would bring the process variable equal to the set point. For most systems, the load changes often or even constantly. Also, the controller of the present invention makes additional correction each cycle to the system input equivalent the change in system load. Due to this unique capacity to change system input based on error and change in load, the controller of the present invention controls the process variable at or very near set point during all phases of system operation. The controller of the present invention has self tuning capability and can provide generation of the set point according to a set of variable parameters. It can be configured as a stand alone controller, as an intelligent Input/Output device for another intelligent device, or be resident another intelligent device such as a programmable controller, computer or other microprocessor based device.

The controller of the prior art does not make corrections to system input based directly on changes in system load. The controller of the at or near set point during changes in load. The controller of the prior arose. The controller of the prior art is not self tuning, and does not have set point generation capacity.

As will be understood by those familiar with the art, the present invention may be embodied in other specific forms without departing from the spirit or essential characteristics thereof. The scope of the present invention is therefore limited only by the scope of the claims appended hereto.

What is claimed is:

1. A controller to control the operation of a system, said system having at least one controllable input and at least one measurable variable, said system including a first signal conditioner to convert a control signal from said controller to an input form required by said system for said controllable input and, a second signal conditioner to detect and convert said measurable variable to a data signal having a format compatible with said controller, said controller comprising:

a processor having three input terminals and an output terminal, one of said input terminals disposed to be coupled to said second signal conditioner of said system to receive said data signal, the second of said input terminals disposed to receive a signal representative of a user selected set point for the operation of said system, the third of said input terminals disposed to receive a timing signal and said output terminal disposed to be coupled to said first signal conditioner to provide said control signal for conversion to said at least one controllable input of said system, said processor to control the operation of said controller and to sequentially calculate and develop said control signal to control the operation of said system; and a memory coupled to said processor and said second signal conditioner to store previous data signals, and intermediate results and values from said processor;

wherein said processor sequentially approximates a present error as the difference between a present set point and a present value of said measurable variable, and calculates a present slope in error of said system;

wherein said processor sequentially sets said present control signal from said controller proportional to a sum of a previous control signal, the present error, and the present slope in error; and wherein said processor approximates a response time for said system as the total time of the difference in time for said system as the total time of the difference in time between when a difference in said control signal is applied to said first coupling unit and when a difference is noted in said data signal that is representative of a change in said measurable variable by said controller for a system with a constant load.

2. The controller as in claim 1 wherein said processor further determines a system characteristic that is proportional to a change in said control signal from said controller to a resultant change in said data signal that is representative of a change in said measurable variable.

3. The controller as in claim 2 wherein the determination of said present control signal also includes said system characteristic multiplied with each of said present error and said present slope in error of said system to convert the units of said error and slope in error to units of said control signal.

4. The controller of claim 3 wherein the determination of said present control signal further includes the addition of a value that is proportional to a change in said present control signal.

5. The controller of claim 3 wherein the determination of said present control signal further includes the approximation of change in load on said system as being proportional to a present change in error converted to control signal units and a previous change in control signal.

6. The controller of claim 3 wherein the determination of said present control signal further includes the approximation of change in load on said system as being proportional to said system characteristic multiplied by said slope of error.

7. The controller of claim 1 wherein said processor further determines a system characteristic that is proportional to a change in said control signal to a resultant change in said measurable variable.

8. The controller of claim 1 wherein said controller is disposed to be incorporated as an intelligent input/output device for another intelligent device to control an aspect of the operation of said system.

9. The controller of claims 1 wherein said controller, in communication with an intelligent device, forms part of a network of such devices wherein each of said intelligent devices controls a different aspect of operation of said system.

10. The controller of claim 1 further includes a bus coupled to said processor via which information from and to other intelligent devices can be transmitted and received.

11. The controller of claim 1 further includes an interface disposed to receive operational parameters from a local operator interface, said interface being coupled to said processor.

12. The controller of claim 1 further includes a display to display to a user selected operational parameters and operating values of said system prior to, during and after operation.

13. The controller as in claim 1 wherein said present slope of error is the change in set point of said measurable variable from a previous interval to a present interval minus the change in said measurable variable of said system from the same previous interval to the same present interval.

14. The controller as in claim 13:
further comprising a time generator coupled to said processor, wherein said processor approximates a response time for said system as the total time of the difference in time between when a difference in said control signal is applied to said first coupling unit and when a difference is noted in said data signal representative of a change in measurable variable by said controller.

15. The controller as in claim 13 wherein a calculated control signal is proportional to said present control signal plus a change in said control signal.

16. The controller as in claim 1 wherein the portion of said present error added as a portion of said present control signal is proportional to a number of time interval cycles occurring within said response time of said system.

17. A controller to control the operation of a system, said system having at least one controllable input and at least one measurable variable, said system including a first signal conditioner to convert a control signal from said controller to an input form required by said system for said controllable input and, a second signal conditioner to detect and convert said measurable variable to a data signal having a format compatible with said controller, said controller comprising:

a processor having two input terminals and an output terminal, one of said input terminals disposed to be coupled to said second signal conditioner of said system to receive said data signal, the second of said input terminals disposed to receive a signal representative of a user selected set point for the operation of said system, and said output terminal disposed be coupled to said first signal conditioner to provide said control signal for conversion to said at least one controllable input of said system, said processor to control the operation of said controller and to sequentially calculate and develop said control signal to control the operation of said system;

a memory coupled to said processor and said second signal conditioner to store previous data signals, and intermediate results and values from said processor;

a bus coupled to said processor via which information from and to other intelligent devices can be transmitted and received; and a time generator coupled to said processor to generate a base cycle time of said processor;

wherein said processor approximates a system response time for said system as the total time of the difference in time between when a difference in said control signal is applied to said first coupling unit and when a difference is noted in said data signal representative of a change in measurable variable by said controller;

wherein said processor determines: a system characteristic that is proportional to the ratio of a change in said control signal to a resultant change in said measurable variable; a present error between actual measurable variable and set point for the measurable variable; and a present slope in error of said measurable variable;

wherein a cycle time of said processor is the time sufficient to make measurements and perform calculations; and wherein said processor sequentially sets a present control signal proportional to the sum of a previous control signal, said present error multiplied by said system characteristic and said cycle time divided by said system response time, and a present change in load that is arrived at by doubling said present slope in error multiplied by said system characteristic.

18. A controller to control the operation of a system, said system having at least one controllable input, said system including a first signal conditioner to convert a control signal from said controller to an input form required by said system for said controllable input and, a second signal conditioner to detect and convert a measurable variable of said system to a data signal having a format compatible with said controller, said controller comprising:

a processor having two input terminals and an output terminal, one of said input terminals disposed to be coupled to said second signal conditioner of said system to receive said data signal, the second of said input terminals disposed to receive a signal representative of a user selected set point for the operation of said system, and said output terminal disposed be coupled to said first signal conditioner to provide said control signal for conversion to said at least one controllable input of said system, said processor to control the operation of said controller and to sequentially calculate and develop said control signal to control the operation of said system;

a memory coupled to said processor and said second signal conditioner to store previous data signals, and intermediate results and values from said processor; and a time generator coupled to said processor to generate a base cycle time of said processor;

wherein said controller controls the rate at which the operation of said system is changed over a period of time to achieve operation at a selected set point by making adjustments to a present set point at selected intervals, initially several parameter and variable values are preset or initialized and stored in said memory including final set point, previous set point, previous rate of change of set point, and maximum rate of change of set point and acceleration of set point; and wherein said processor during each cycle time compares said previous set point with said final set point to determine if a change in said present set point is necessary, if said previous set point equals said final set point, said present set point is set equal said previous set point, and if said previous set point is less than or greater than said final set point, the values of said present rate of change of set point and acceleration of set point may be adjusted to cause said present set point to change to achieve said final set point.

19. The controller of claim 18 wherein during each cycle time if said previous set point is not equal to said final set point, a first value of said set point is estimated at a next unit of time without a change in said previous set point, a second value of set point is estimated where a rate of change of said set point is to be changed for said system to reach said final set point, said first and second values are compared, and from the result of said comparison a next present set point is determined.

20. The controller of claim 19 wherein if said final set point is greater than said present set point, where said first value is compared to said second value, if said second value is greater than said first value, said present rate of change of set point is compared to said maximum rate of change of said set point, if said present rate of change of set point has the lesser value, said acceleration of set point remains unchanged and a new present set point is selected proportional to the sum of said acceleration of set point multiplied by said cycle time squared, said previous rate of change of set point multiplied by said cycle time, and said previous set point, and if said maximum rate of change of said set point and said present rate of change of set point are equal, said rate of change of set point is set equal to said maximum rate of change of set point, said acceleration of set point is set to zero, and a new present set point is selected proportional to the sum of said maximum rate of change of set point multiplied by said cycle time, and said previous set point, and if said present rate of change of set point has the greater value, said acceleration of set point is set to the negative value of itself and a new present set point is selected proportional to the sum of said acceleration of set point multiplied by said cycle time squared, said previous rate of change of set point multiplied by said cycle time, and said previous set point, and if said first value is greater than said second value, said acceleration of set point is set proportional to the negative of said present rate of change of set point squared divided by the difference between said present set point and said final set point, and said next present set point is selected proportional to the sum of said acceleration of set point multiplied by said cycle time squared, said previous rate of change of set point multiplied by said cycle time, and said previous set point.

21. The controller of claim 19 wherein if said final set point is less than said present set point, where said first value is compared to said second value, if said first value is greater than said second value, said present rate of change of set point is compared to the negative of said maximum rate of change of said set point, if said present rate of change of set point has the greater value, said acceleration of set point is set to the negative value of itself and a new present set point is selected proportional to the sum of said acceleration of set point multiplied by said cycle time squared, said previous rate of change of set point multiplied by said cycle time, and said previous set point, and if said negative of said maximum rate of change of said set point and said present rate of change of set point are equal, said rate of change of set point is set equal to the negative of said maximum rate of change of set point, said acceleration of set point is set to zero, and a new present set point is selected proportional to the sum of said maximum rate of change of set point multiplied by said cycle time, and said previous set point, and if said present rate of change of set point has the lesser value, said acceleration of set point remains unchanged and a new present set point is selected proportional to the sum of said acceleration of set point multiplied by said cycle time squared, said previous rate of change of set point multiplied by said cycle time, and said previous set point, and if said first value is less than said second value, said acceleration of set point is set proportional to said present rate of change of set point squared divided by the difference between said present set point and said final set point, and said new present set point is selected proportional to the sum of said acceleration of set point multiplied by said cycle time squared, said previous rate of change of set point multiplied by said cycle time, and said previous set point.

22. A method for controlling the operation of a system by developing a control signal, said system having at least one controllable input and at least one measurable variable, said system including a first signal conditioner to convert said control signal from a controller to an input form required by said system for said controllable input and, a second signal conditioner to detect and convert said measurable variable to a data signal having a format compatible with said controller, said controller disposed to receive a signal representative of a user selected set point for the operation of said system, said method of developing said control signal comprising the steps of:
  a. sequentially approximating a present error as the difference between a present set point and a present value of said measurable variable; and calculating a present slope in error of said system;
  b. sequentially setting said present control signal proportional to a sum of a previous control signal, the present error, and the present slope in error; and
  c. approximating a response time for said system as the total time of the difference in time between when a difference in said control signal is applied to said first coupling unit and when a difference is noted in said data signal that is representative of a change in said measurable variable for a system with a constant load.

23. The method of claim 22 further including the step of:
  d. approximating a system characteristic that is proportional to a change in said control signal to a resultant change in said measurable variable.

24. The method as in claim 22 further including the step of:
  d. calculating said present slope of error as the change in set point of said measurable variable from a previous interval to a present interval minus the change in said measurable variable of said system from the same previous interval to the same present interval.

25. The method as in claim 24 further includes the steps of:
  e. approximating a response time for said system as the total time of the difference in time between when a difference in said control signal is applied to said first coupling unit and when a difference is noted in said data signal that is representative of a change in said measurable variable for an unloaded system.

26. The method as in claim 24 further including the step of:
  e. calculating a control signal that is proportional to said present control signal plus a change in said control signal.

27. The method as in claim 22 wherein the portion of said present error of step a. added as a portion of said present control signal in step b. is proportional to a number of time interval cycles occurring within said response time of said system.

28. A method for controlling the operation of a system by developing a control signal, said system having at least one controllable input and at least one measurable variable, said system including a first signal conditioner to convert said control signal from a controller to an input form required by said system for said controllable input and, a second signal conditioner to detect and convert said measurable variable to a data signal having a format compatible with said controller, and a data bus, said controller disposed to receive a signal representative of a user selected set point for the operation of said system, wherein cycle time is the time sufficient to make measurements and perform calculations, said method of developing said control signal comprising the steps of:
  a. generating a base cycle time;
  b. approximating a system response time for said system as the total time of the difference in time between when a difference in said control signal is applied to said first coupling unit and when a difference is noted in said data signal that is representative of a change in said measurable variable;
  c. sequentially approximating a present error as the difference between a present set point and a present value of said measurable variable;
  d. calculating a present slope in error of said system;
  e. approximating a system characteristic that is proportional to a change in said control signal to a resultant change in said data signal that is representative of a change in said measurable variable;
  f. approximating a present change in load by doubling said present slope in error multiplied by said system characteristic;
  g. sequentially setting a present control signal proportional to the sum of a previous control signal, said present error multiplied by said system characteristic and said cycle time divided by said system response time, and said present change in load; and
  h. transmitting and receiving data to and from an other intelligent device via said data bus.

29. A method for controlling the operation of a system by developing a control signal, said system having at least one controllable input, said system including a first signal conditioner to convert said control signal from a controller to an input form required by said system for said controllable input and, a second signal conditioner to detect and convert said measurable variable to a data signal having a format compatible with said controller, said controller disposed to receive a signal representative of a user selected set point for the operation of said system, said method of developing said control signal comprising the steps of:
  a. generating a base cycle time;
  b. presetting or initializing final set point, previous set point, previous rate of change of set point, and maximum rate of change of set point and acceleration of set point;
  c. comparing, during each cycle time, said present set point with said final set point to determine if a change in said present set point is necessary;
  d. if as a result of step c. said previous set point equals said final set point, said present rate of change of set point and acceleration of set point are each set to zero, resulting in said set point remaining unchanged and the present set point being set equal said previous set point; and
  e. if as a result of step d. said previous set point is less than or greater than said final set point, the values of said present rate of change of set point and acceleration of set point may be adjusted to cause said present set point to change to achieve said final set point.

30. The method of claim 29 wherein step e. further includes the steps of:
  f. estimating a first value of said set point at a next unit of time without a change in said previous set point;
  g. estimating a second value of said set point where said rate of change of said set point is to be changed for said system to reach final set point;
  h. comparing said first and second values of steps f. and g.; and
  i. determining a next present set point from the result of step h.

31. The method of claim 30 wherein step i. further includes the steps of:
  j. determining if said final set point is greater than said present set point;
  k. if step j. is true and if said second value is greater than said first value in step h., comparing said present rate of change of set point to said maximum rate of change of said set point;

l. from step k. if said present rate of change of set point is the lesser value, said acceleration of set point remains unchanged and selecting a new present set point proportional to the sum of said acceleration of set point multiplied by said cycle time squared, said previous rate of change of set point multiplied by said cycle time, and said previous set point;

m. from step k. if said present rate of change of set point and said maximum rate of change of said set point are equal, setting said rate of change of set point equal to said maximum rate of change of set point, said acceleration of set point to zero, and selecting a new present set point proportional to the sum of said maximum rate of change of set point multiplied by said cycle time, and said previous set point; and n. from step k. if said present rate of change of set point has the greater value, said acceleration of set point is set to the negative value of itself and a new present set point is selected proportional to the sum of said acceleration of set point multiplied by said cycle time squared, said previous rate of change of set point multiplied by said cycle time, and said previous set point, and o. if step j. is true and if said first value is greater than said second value in step h., setting said acceleration of set point proportional to the negative of said present rate of change of set point squared divided by the difference between said present set point and said final set point, and said next present set point proportional to the sum of said acceleration of set point multiplied by said cycle time squared, said previous rate of change of set point multiplied by said cycle time, and said previous set point.

32. The method of claim 30 wherein step i. further includes the steps of:

j. determining if said final set point is less than said present set point;

k. if step j. is true and if said first value is greater than said second value in step h., comparing said present rate of change of set point to the negative of said maximum rate of change of said set point;

l. from step k. if said present rate of change of set point is the greater value, setting said acceleration of set point to the negative of said acceleration of set point and selecting a new present set point proportional to the sum of said acceleration of set point multiplied by said cycle time squared, said previous rate of change of set point multiplied by said cycle time, and said previous set point;

m. from step k. if said present rate of change of set point and said maximum rate of change of set point are equal, setting said rate of change of set point equal to the negative value of said maximum rate of change of set point, said acceleration of set point to zero, and selecting a new present set point proportional to the sum of the negative value of said maximum rate of change of set point multiplied by said cycle time, and said previous set point; and n. from step k. if said present rate of change of set point has the lesser value, said acceleration of set point remains unchanged and a new present set point is selected proportional to the sum of said acceleration of set point multiplied by said cycle time squared, said previous rate of change of set point multiplied by said cycle time, and said previous set point, and o. if step j. is true and said first value is greater than said second value in step h., setting said acceleration of set point proportional to said present rate of change of set point squared divided by the difference between said present set point and said final set point, and said next present set point proportional to the sum of said acceleration of set point multiplied by said cycle time squared, said previous rate of change of set point multiplied by said cycle time, and said previous set point.

33. A computer-implemented method for controlling the operation of a system by developing a control value, said system having at least one controllable input and at least one measurable variable, said computer-implemented method comprising the steps of:

a. entering a user selected set point for the operation of said system;

b. sequentially approximating a present error as the difference between a present set point and a present value of said measurable variable, and calculating a present slope in error of said system;

c. sequentially setting said present control value proportional to a sum of a previous control signal, the present error, and the present slope in error; and d. approximating a response time for said system as the total time of the difference in time between when a difference in said control value is applied to said system and when a difference is noted in said measurable variable for a system with a constant load.

34. The computer-implemented method of claim 33 further including the step of:

e. approximating a system characteristic that is proportional to a change in said control value to a resultant change in said measurable variable.

35. The computer-implemented method as in claim 33 further including the step of:

e. calculating said present slope of error as the change in set point of said measurable variable from a previous interval to a present interval minus the change in said measurable variable of said system from the same previous interval to the same present interval.

36. The computer-implemented method as in claim 35 further includes the steps of:

f. approximating a response time for said system as the total time of the difference in time between when a difference in said control value is applied to said system and when a difference is noted in said measurable variable.

37. The computer-implemented method as in claim 35 further including the step of:

f. calculating a control value that is proportional to said present control value plus a change in said control value.

38. The computer-implemented method as in claim 33 wherein the portion of said present error of step b. is added as a portion of said present control value in step c. is proportional to a number of time interval cycles occurring within said response time of said system.

39. A computer-implemented method for controlling the operation of a system by developing a control value, said system having at least one controllable input, at least one measurable variable and a data bus, wherein cycle time is the time sufficient to make measurements and perform calculations, said method of developing said control value comprising the steps of:

a. entering a user selected set point for the operation of said system;

b. generating a base cycle time;

c. approximating a system response time for said system as the total time of the difference in time between when a difference in said control value is applied to said controllable input of said system and when a difference is noted in said measurable variable;

d. sequentially approximating a present error as the difference between a present set point and a present value of said measurable variable;

e. calculating a present slope in error of said system;

f. approximating a system characteristic that is proportional to a change in said control signal to a resultant change in said data signal that is representative of a change in said measurable variable;

g. approximating a present change in load by doubling said present slope in error multiplied by said system characteristic;

h. sequentially setting a present control value proportional to the sum of a previous control value, said present error multiplied by said system characteristic and said cycle time divided by said system response time, and said present change in load; and i. transmitting and receiving data to and from an other intelligent device via said data bus.

40. A computer-implemented method for controlling the operation of a system by developing a control value, said system having at least one controllable input, said method of developing said control value comprising the steps of:

a. entering a user selected set point for the operation of said system;

b. generating a base cycle time;

c. presetting or initializing final set point, previous set point, previous rate of change of set point, and maximum rate of change of set point and acceleration of set point;

d. comparing, during each cycle time, said present set point with said final set point to determine if a change in said present set point is necessary;

e. if as a result of step d. said previous set point equals said final set point, resulting in said set point remaining unchanged and the present set point being set equal said previous set point; and f. if as a result of step e. said previous set point is less than or greater than said final set point, the values of said present rate of change of set point and acceleration of set point may be adjusted to cause said present set point to change to achieve said final set point.

41. The computer-implemented method of claim 40 wherein step f. further includes the steps of:

g. estimating a first value of said set point at a next unit of time without a change in said previous set point;

h. estimating a second value of set point where a rate of change of said set point is to be changed for said system to reach said final set point;

i. comparing said first and second values of steps g. and h.; and j. determining a next present set point from the result of step i.

42. The computer-implemented method of claim 41 wherein step j. further includes the steps of:

k. determining if said final set point is greater than said present set point;

l. if step k. is true and if said second value is greater than said first value in step i., comparing said present rate of change of set point to said maximum rate of change of said set point;

m. from step l. if said present rate of change of set point is the lesser value, said acceleration of set point remains unchanged and selecting a new present set point proportional to the sum of said acceleration of set point multiplied by said cycle time squared, said previous rate of change of set point multiplied by said cycle time, and said previous set point;

n. from step l. if said present rate of change of set point and said maximum rate of change of set point are equal, setting said rate of change of set point equal to said maximum rate of change of set point, said acceleration of set point to zero, and selecting a new present set point proportional to the sum of said maximum rate of change of set point multiplied by said cycle time, and said previous set point; and o. from step l. if said present rate of change of set point has the greater value, said acceleration of set point is set to the negative value of itself and a new present set point is selected proportional to the sum of said acceleration of set point multiplied by said cycle time squared, said previous rate of change of set point multiplied by said cycle time, and said previous set point, and p. if step k. is true and if said first value is greater than said second value in step i., setting said acceleration of set point proportional to the negative of said present rate of change of set point squared divided by the difference between said present set point and said final set point, and said next present set point proportional to the sum of said acceleration of set point multiplied by said cycle time squared, said previous rate of change of set point multiplied by said cycle time, and said previous set point.

43. The computer-implemented method of claim 41 wherein step j. further includes the steps of:

k. determining if said final set point is less than said present set point;

l. if step k. is true and if said first value is greater than said second value in step i., comparing said present rate of change of set point to the negative of said maximum rate of change of said set point;

m. from step l. if said present rate of change of set point is the greater value, setting said acceleration of set point to the negative of said acceleration of set point and selecting a new present set point proportional to the sum of said acceleration of set point multiplied by said cycle time squared, said previous rate of change of set point multiplied by said cycle time, and said previous set point;

n. from step l. if said present rate of change of set point and said maximum rate of change of said set point are equal, setting said rate of change of set point equal to the negative value of said maximum rate of change of set point, said acceleration of set point to zero, and selecting a new present set point proportional to the sum of the negative value of said maximum rate of change of set point multiplied by said cycle time, and said previous set point; and o. from step l. if said present rate of change of set point has the lesser value, said acceleration of set point remains unchanged and a new present set point is selected proportional to the sum of said acceleration of set point multiplied by said cycle time squared, said previous rate of change of set point multiplied by said cycle time, and said previous set point, and p. if step k. is true and said first value is greater than said second value in step i., setting said acceleration of set point proportional to said present rate of change of set point squared divided by the difference between said present set point and said final set point, and said next present set point proportional to the sum of said acceleration of set point multiplied by said cycle time squared, said previous rate of change of set point multiplied by said cycle time, and said previous set point.

44. A method for controlling the operation of a system by developing a control signal, said system having at least one controllable input and at least one measurable variable, said system including a first signal conditioner to convert said control signal from a controller to an input form required by said system for said controllable input and, a second signal conditioner to detect and convert said measurable variable to a data signal having a format compatible with said controller, said controller disposed to receive a signal representative of a user selected set point for the operation of said system, said method of developing said control signal comprising the steps of:

a. sequentially approximating a present error as the difference between a present set point and a present value of said measurable variable; and calculating a present slope in error of said system;

b. sequentially setting said present control signal proportional to a sum of a previous control signal, the present error, and the present slope in error;

c. approximating a system characteristic that is proportional to a change in said control signal to a resultant change in said data signal that is representative of a change in said measurable variable; and d. multiplying said system characteristic with each of said present error and said present slope in error of said system to convert the units of said error and slope in error to units of said control signal.

45. The method of claim 44 further includes the step of:

e. approximating a change in load on said system that is proportional to a present change in error converted to control signal units and a previous change in control signal; and f. approximating a control signal that is proportional to a sum of said change in load on said system from step e.

46. The method of claim 44 further includes the step of:

e. approximating a change in load on said system that is proportional to said system characteristic multiplied by said slope of error.

47. The method of claim 44 further includes the step of:

e. approximating a change in load on said system that is proportional to a present change in error converted to control signal units and a previous change in control signal.

48. A computer-implemented method for controlling the operation of a system by developing a control value, said system having at least one controllable input and at least one measurable variable, said computer-implemented method comprising the steps of:

a. entering a user selected set point for the operation of said system;

b. sequentially approximating a present error as the difference between a present set point and a present value of said measurable variable, and calculating a present slope in error of said system;

c. sequentially setting said present control value proportional to a sum of a previous control signal, the present error, and the present slope in error;

d. approximating a system characteristic that is proportional to a change in said control value to a resultant change in said measurable variable; and e. multiplying said system characteristic with each of said present error and said present slope in error of said system to convert the units of said error and slope in error to units of said control value.

49. The computer-implemented method of claim 48 further includes the steps of:

f. approximating a change in load on said system that is proportional to a present change in error converted to control signal units and a previous change in control signal; and g. approximating a control value that is proportional to a sum of said change in load on said system from step f.

50. The computer-implemented method of claim 48 further includes the steps of:

f. approximating a change in load on said system that is proportional to said system characteristic multiplied by said slope of error.

51. The computer-implemented method of claim 48 further includes the steps of:

f. approximating a change in load on said system that is proportional to a present change in error converted to control signal units and a previous change in control signal.

52. A controller to control the operation of a system, said system having at least one controllable input and at least one measurable variable, said system including a first signal conditioner to convert a control signal from said controller to an input form required by said system for said controllable input and, a second signal conditioner to detect and convert said measurable variable to a data signal having a format compatible with said controller, said controller comprising:

a processor having two input terminals and an output terminal, one of said input terminals disposed to be coupled to said second signal conditioner of said system to receive said data signal, the second of said input terminals disposed to receive a signal representative of a user selected set point for the operation of said system, and said output terminal disposed be coupled to said first signal conditioner to provide said control signal for conversion to said at least one controllable input of said system, said processor to control the operation of said controller and to sequentially calculate and develop said control signal to control the operation of said system; and a memory coupled to said processor and said second signal conditioner to store previous data signals, and intermediate results and values from said processor;

wherein said processor sequentially approximates a present error, and calculates a present slope in error of said system;

wherein said processor sequentially sets said present control signal from said controller proportional to a sum of a previous control signal, the present error, and the present slope in error; and wherein said processor approximates a response time for said system as the total time of the difference in time between when a difference in said control signal is applied to said first coupling unit and when a difference is noted in said data signal that is representative of a change in said measurable variable for a system with a constant load.

53. A method for controlling the operation of a system by developing a control signal, said system having at least one controllable input and at least one measurable variable, said system including a first signal conditioner to convert said control signal from a controller to an input form required by said system for said controllable input and, a second signal conditioner to detect and convert said measurable variable to a data signal having a format compatible with said controller, said controller disposed to receive a signal representative of a user selected set point for the operation of said system, said method of developing said control signal comprising the steps of:

a. sequentially approximating a present error; and calculating a present slope in error of said system;

b. sequentially setting said present control signal proportional to a sum of a previous control signal, the present error, and the present slope in error; and c. approximating a response time for said system as the total time of the difference in time between when a difference in said control signal is applied to said first coupling unit and when a difference is noted in said data signal that is representative of a change in said measurable variable for a system with a constant load.

54. A computer-implemented method for controlling the operation of a system by developing a control value, said system having at least one controllable input and at least one measurable variable, said computer-implemented method comprising the steps of:

a. entering a user selected set point for the operation of said system;

b. sequentially approximating a present error, and calculating a present slope in error of said system;

c. sequentially setting said present control value proportional to a sum of a previous control signal, the present error, and the present slope in error; and d. approximating a response time for said system as the total time of the difference in time between when a difference in said control value is applied to said system and when a difference is noted in said measurable variable for a system with a constant load.

55. A controller to control the operation of a system, said system having at least one controllable input and at least one measurable variable, said system including a first signal conditioner to convert a control signal from said controller to an input form required by said system for said controllable input and, a second signal conditioner to detect and convert said measurable variable to a data signal having a format compatible with said controller, said controller comprising:

a processor having two input terminals and an output terminal, one of said input terminals disposed to be coupled to said second signal conditioner of said system to receive said data signal, the second of said input terminals disposed to receive a signal representative of a user selected set point for the operation of said system, and said output terminal disposed be coupled to said first signal conditioner to provide said control signal for conversion to said at least one controllable input of said system, said processor to control the operation of said controller and to sequentially calculate and develop said control signal to control the operation of said system; and a memory coupled to said processor and said second signal conditioner to store previous data signals, and intermediate results and values from said processor;

wherein said processor sequentially approximates a present error, and calculates a present slope in error of said system;

wherein said processor sequentially sets said present control signal from said controller proportional to a sum of a previous control signal, the present error, and the present slope in error; and wherein said processor approximates a system characteristic that is proportional to a change in said control signal to a resultant change in said data signal that is representative of a change in said measurable variable.

56. A method for controlling the operation of a system by developing a control signal, said system having at least one controllable input and at least one measurable variable, said system including a first signal conditioner to convert said control signal from a controller to an input form required by said system for said controllable input and, a second signal conditioner to detect and convert said measurable variable to a data signal having a format compatible with said controller, said controller disposed to receive a signal representative of a user selected set point for the operation of said system, said method of developing said control signal comprising the steps of:

a. sequentially approximating a present error; and calculating a present slope in error of said system;

b. sequentially setting said present control signal proportional to a sum of a previous control signal, the present error, and the present slope in error; and c. approximating a system characteristic that is proportional to a change in said control signal to a resultant change in said data signal that is representative of a change in said measurable variable.

57. A computer-implemented method for controlling the operation of a system by developing a control value, said system having at least one controllable input and at least one measurable variable, said computer-implemented method comprising the steps of:

a. entering a user selected set point for the operation of said system;

b. sequentially approximating a present error, and calculating a present slope in error of said system;

c. sequentially setting said present control value proportional to a sum of a previous control signal, the present error, and the present slope in error; and d. approximating a system characteristic that is proportional to a change in said control value to a resultant change in said measurable variable.

* * * * *